(12) United States Patent
Kirkpatrick et al.

(10) Patent No.: US 8,826,145 B1
(45) Date of Patent: Sep. 2, 2014

(54) UNIFIED WEB AND APPLICATION FRAMEWORK

(75) Inventors: Ficus Kirkpatrick, San Francisco, CA (US); Joseph M. Onorato, Cambridge, MA (US); David P. Bort, Palo Alto, CA (US)

(73) Assignee: Google Inc., Mountain View, CA (US)

(*) Notice: Subject to any disclaimer, the term of this patent is extended or adjusted under 35 U.S.C. 154(b) by 1049 days.

(21) Appl. No.: 12/268,853

(22) Filed: Nov. 11, 2008

Related U.S. Application Data

(60) Provisional application No. 60/987,324, filed on Nov. 12, 2007.

(51) Int. Cl.
*G06F 3/00* (2006.01)
*G06F 5/00* (2006.01)

(52) U.S. Cl.
CPC ........................................ *G06F 5/00* (2013.01)
USPC ........... 715/746; 715/239; 715/744; 715/760; 715/864

(58) Field of Classification Search
CPC ........................................................ G06F 5/00
USPC .................... 715/239, 760, 744, 746, 864
See application file for complete search history.

(56) References Cited

U.S. PATENT DOCUMENTS

| | | | |
|---|---|---|---|
| 5,995,756 A * | 11/1999 | Herrmann | 717/178 |
| 6,119,166 A | 9/2000 | Bergman et al. | |
| 7,917,521 B2 | 3/2011 | Brown et al. | |
| 2010/0287618 A1 | 11/2010 | Howell et al. | |

* cited by examiner

*Primary Examiner* — Andrey Belousov
(74) *Attorney, Agent, or Firm* — Fish & Richardson P.C.

(57) ABSTRACT

The subject matter of this specification can be embodied in, among other things, a method that includes receiving an indication that a first activity has occurred. The first activity is associated with a uniform resource identifier (URI) that specifies at least one web page. The method also includes identifying an application that is associated with the URI using a registry that associates particular URIs with particular applications, retrieving, using the identified application, content associated with the URI, displaying the content or information derived from the content in a first format that is not controlled by a second format specified by a markup language of the at least one web page.

18 Claims, 16 Drawing Sheets

UNIFIED WEB AND APPLICATION FRAMEWORK

CROSS-REFERENCE TO RELATED APPLICATIONS

This application claims priority to U.S. Application Ser. No. 60/987,324, filed on Nov. 12, 2007, and entitled "Unified Web and Application Framework," the contents of which are hereby incorporated in its entirety by reference.

TECHNICAL FIELD

This instant specification relates to software architecture, and more specifically, to integrating web and native application platforms.

BACKGROUND

As computers and computer networks become more and more able to access a variety of dynamic web-based content, people are demanding more ways to obtain that content. Specifically, people now expect to have access, on the road, in the home, or in the office, to dynamic content previously available only from a permanently-connected personal computer hooked to an appropriately provisioned network. They want to view web pages from their personal digital assistants (PDAs), cell phones, and palm tops. They also want all of this web page content when traveling, whether locally, domestically, or internationally, in an easy-to-use, portable device.

To view the content, a user can launch a web browser on a portable device. Portability generally requires a device small in size, which in turn limits the screen area available for displaying content. This limitation may require the portable device to reduce web page content to an illegible or unrecognizable state when displayed on a small screen. Alternatively, the content may be displayed at a larger size, but a user must scroll to see some parts of the content. Additionally, if a link to a web page is provided in a first application on the portable device, a user's selection of the link first launches a web browser before the web page can be displayed.

SUMMARY

In general, this document describes integrating software models defining native applications and access to web content.

In a first general aspect, a computer-implemented method is described. The method includes receiving an indication that a first activity has occurred. The first activity is associated with a uniform resource identifier (URI) that specifies at least one web page. The method also includes identifying an application that is associated with the URI using a registry that associates particular URIs with particular applications, retrieving, using the identified application, content associated with the URI, displaying the content or information derived from the content in a first format that is not controlled by a second format specified by a markup language of the at least one web page.

In a second general aspect, a computer-implemented method is described that includes associating a particular uniform resource identifier (URI) specifying at least a web domain with a particular application and retrieving, by the application, content associated with the URI in response to an occurrence of an activity that includes the URI. The method also includes displaying the content or information derived from the content in a first format that is not controlled by a second format specified by a markup language of a web page within the web domain.

In another general aspect, a computer-implemented method is described, which associates a first uniform resource identifier (URI) that specifies a web page with a first non-browser application, associates a second URI that specifies a second application stored in local memory on a device, and invokes, in response to a first detected activity that includes the first URI, the non-browser application configured to display content associated with the URI or information derived from the content in a first format that is not controlled by a second format specified by a markup language of the web page specified by the URI. The method also invokes, in response to a second detected activity that includes the second URI, a second application configured to display content stored in the local memory.

In yet another general aspect, a system is described. The system includes means for identifying a particular application that is associated with a particular uniform resource identifier (URI) that specifies one or more web pages specified by the URI in response to receiving an indication that the URI has been selected, wherein the identified application is configured to retrieve content associated with the URI. The system also includes an interface to output the content or information derived from the content for display in a first format that is not controlled by a second format specified by a markup language of one or more web pages specified by the URI.

The systems and techniques described here may provide one or more of the following advantages. First, seamless integration between viewing locally stored content and remote content can be provided. Second, uniform resource identifiers (URIs) can be intercepted so that content from a web page is displayed within an application optimized for the displaying device. Third, local content can be used with remote content to generate new content in a way that is transparent to a user. Fourth, applications that use content from a web page can be designed by users with little programming experience.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes exemplary systems and techniques for integrating software models that define native applications and software models that define access and display of web content. In certain implementations, a particular application on a mobile device can intercept a user's selection (or input) of uniform resource identifiers (URIs) that specify a particular web page or a web domain. The application can retrieve content from the web page associated with the URI instead of displaying the web page in a browser. The application also can format the content in a way that is more conducive to display on a small screen of the mobile device (e.g., a screen of a cell phone).

In other implementations, as well as specifying web pages, URIs also can specify applications and particular functions performed by the applications. For example, through selection of URIs, a user can navigate seamlessly between applications and web pages because both can be called based on URI selection. The seamless navigation is also facilitated because a non-browser application can intercept URIs that specify web pages and display the content (or information derived from the content) in a way that integrates the content into a user interface (UI) of the application instead of displaying web pages in a browser application.

Here, a browser application refers to an application that displays web pages based on a markup language included in the web pages. A non-browser application can refer to an application which is not configured to display web pages, but may—in some implementations—display content from web pages in a format that is not controlled by a markup language of the web pages. A native application for a client device can refer to an application that is resident on the client device (e.g., the mobile device) as opposed to being hosted on a remote device (e.g. a web server).

In other implementations, an application of a device (e.g., a cell phone or a personal computer) can retrieve content as discussed above and combine the content with information generated or stored by the device. For example, an application on a cell phone can retrieve content describing the locations of several restaurants from one or more web sites and combine the location information with global positioning information generated by the cell phone to display the restaurant that is closest to the cell phone's current position. These implementations, as well as additional implementations are described more fully below.

Figure 1A:
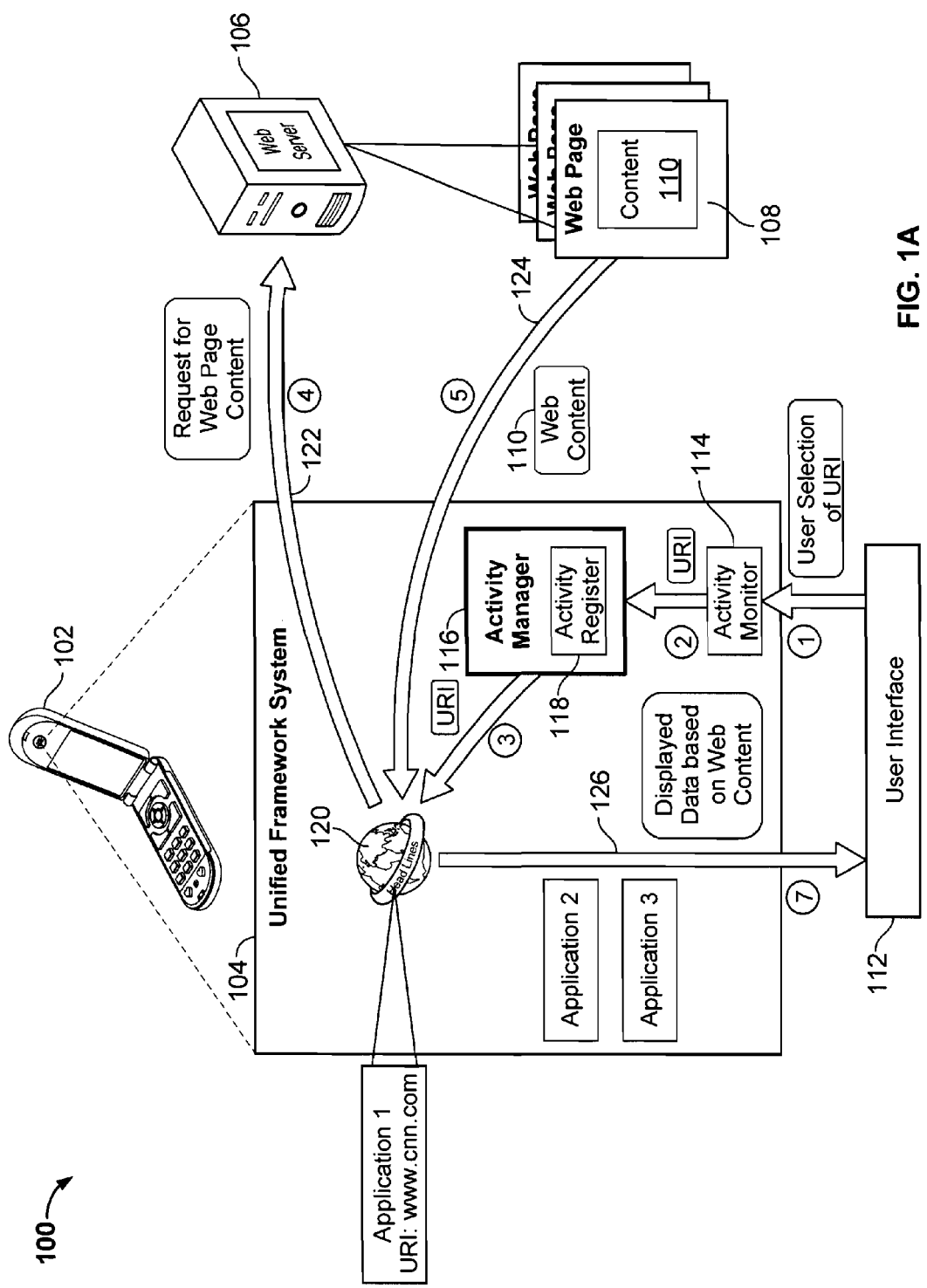
FIGS. 1A and 1B are schematic diagrams of exemplary systems that disassociate a presentation layer from a web browser and re-associate the presentation layer with another application.
Figure 1B:
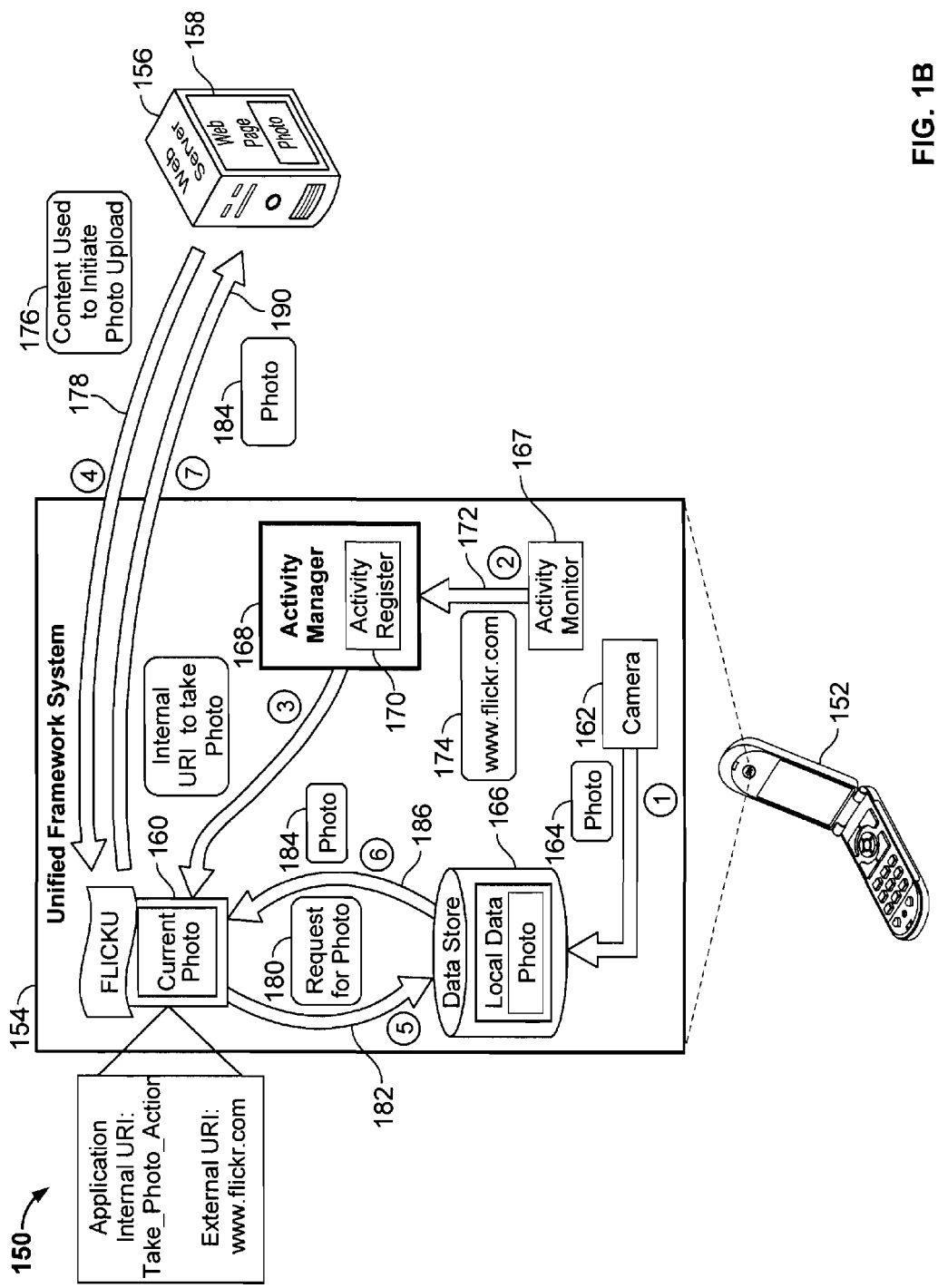

FIGS. 1A and 1B are schematic diagrams of exemplary systems 100, 150 that disassociate a presentation layer from a web browser and re-associate the presentation layer with another application. Associating the presentation layer with a non-browser application instead of with the browser can facilitate a seamless transition between native applications and web content as previously described. In FIG. 1A, the system 100 includes a cell phone 102 that has a unified framework system 104 that can integrate native applications and web content. The system 100 also includes a web server 106 that stores one or more web pages 108 that have content 110 (e.g., text, images, video, etc.).

In the illustrated implementation, a user of the cell phone 102 can select a URI that is displayed on a user interface 112 to accomplish desired actions. For example, the user can select a URI that specifies the web site "www.cnn.com." The unified framework system 104 can have several components that are activated when the user selects the URI. The components may include an activity monitor 114 that detects the selection of the URI, an activity manager 116 having an activity register 118, and an application 120 (shown here as an application titled "Headlines").

Once the activity monitor 114 detects the selection of the URI, the monitor 114 can forward the URI to the activity manager 116. The activity manager can access the activity register 118 to determine which application is associated with the URI. For example, the activity manager can identify which application is associated with the URI specifying the www.cnn.com web site.

After locating the appropriate application, the URI is then forwarded to that application. In the example shown in FIG. 1A, the URI is forwarded to the application 120 called "Headlines." In this implementation, the Headlines application is not a browser that displays web pages. Instead, the Headlines application requests web page content from the web server 106 (in this case the CNN web server) as a shown by the arrow 122. The web server 106 returns to the web content 110 as shown by the arrow 124.

The returned web content 110 may include only a portion of a web page. For example, the content 110 can include the headlines listed on the www.cnn.com web site while excluding content of the articles associated with the headlines.

The Headlines application, in some implementations, can reformat or otherwise process the web content and display the results to the user interface 112 as indicated by the arrow 126. A screenshot of this application (according to one implementation) and more details are described in association with FIG. 5A.

FIG. 1B shows the system 150 that includes a mobile device 152 having a unified framework system 154 that can integrate locally stored content with web content that is stored on a web server 156, which serves web pages 158. In this example, the web server 156 is the www.flickr.com web server that stores web pages having digital images. Uploading locally stored data to the web server 156 can be integrated into native applications stored on the mobile device 156 so that the transmission to the web server 156 does not require accessing a web page through a web browser.

In certain implementations, an application 160 (e.g., the application titled "FlickU") can upload local data to the web server 156 instead of requiring a user to upload the local data through an interface on a web page hosted by the web server 156. For example, the mobile device 152 has a camera 162. The user can select a URI titled "Take a picture." In some implementations, the "Take a picture" URI is displayed within a user interface for a camera application that the user has previously opened.

The activity monitor 167 can transmit the selected URI to an activity manager 168 that uses an activity register 170 to find the application associated with the URI. In this case, the associated application is the same camera application that displayed the URI (although in other implementations a different application could be associated with the URI).

The activity monitor forwards the URI to the camera application, which—in some implementations—parses the URI to determine the appropriate action to take. For example, the URI can include information that specifies that the camera application should take a photo. The camera application initiates a photo capture activity and the resulting photo is stored in a local data store 166.

In the example of FIG. 1B, in response to the captured photo activity, the camera application can initiate another activity that includes a second URI that specifies an upload page for the www.flickr.com web server 156. The activity can be detected by the activity monitor 167 and forwarded to the activity manager as indicated by an arrow 172. The activity manager 168 can access the activity register 170 to determine what application is associated with the www.flickr.com URI 174. In this example, the URI 174 is associated with the FlickU application 160, so the activity manager 168 forwards the URI 174 to the FlickU application 160, which can parse the URI 174 to determine what action to execute.

Based on the URI 174, the FlickU application 160 transmits a request to an upload web page 158 on the web server 156. In this example, when a web browser accesses the upload web page 158, the web page 158 typically displays user interface elements used to upload a photo to the www.flickr.com web server 156. The request transmitted by the FlickU application 160 can include a request for the contents of the upload web page 158 including information used to upload photos to the web server 156. In response to the request, the web server 156 transmits the content used to initiate a photo upload 176 as shown by an arrow 178.

The FlickU application can format all or a portion of the content received from the web server 156 and initiate a third activity that includes a URI that specifies the location of the recently taken photo. The activity monitor 167 and activity manager 168 can process the URI as described previously. In this example, the URI specifying the location of the photo is handled by the FlickU application, which requests 180 the photo from the local storage 166 as indicated by an arrow 182. The FlickU application 160 receives the photo 184 from the data store 166 as indicated by an arrow 186 and displays the photo 184 with the formatted content received from the web server 156.

For example, the application may display the recently captured photo with a button that indicates that the user should select the button if the user wishes to upload the photo to his or her flickr account on the www.flickr.com web server 156. Using the content 176 received from the web server 156, the FlickU application 160 can associate a function with the button so that a selection of the button initiates an upload to the web server 156 in substantially the same way as if the user uploaded the photo using the upload web page 158. If a user selects the button, the recently taken photo 184 is uploaded to the www.flickr.com web server 156 as indicated by an arrow 190.

In some situations, access to the web page 158 may require a form of authentication such as a cookie. In these situations, the application 160 can access a globally accessible storage location that contains authentication information used by applications that are installed on the device 152. For example, the FlickU application 160 can access a data structure (e.g., a global cookie jar) that stores cookies used to authenticate a user on web sites. The FlickU application 160 can then transmit the cookie associated with the www.flickr.com web server along with the request to upload the photo 184 shown in by the arrow 190.

Figure 2:
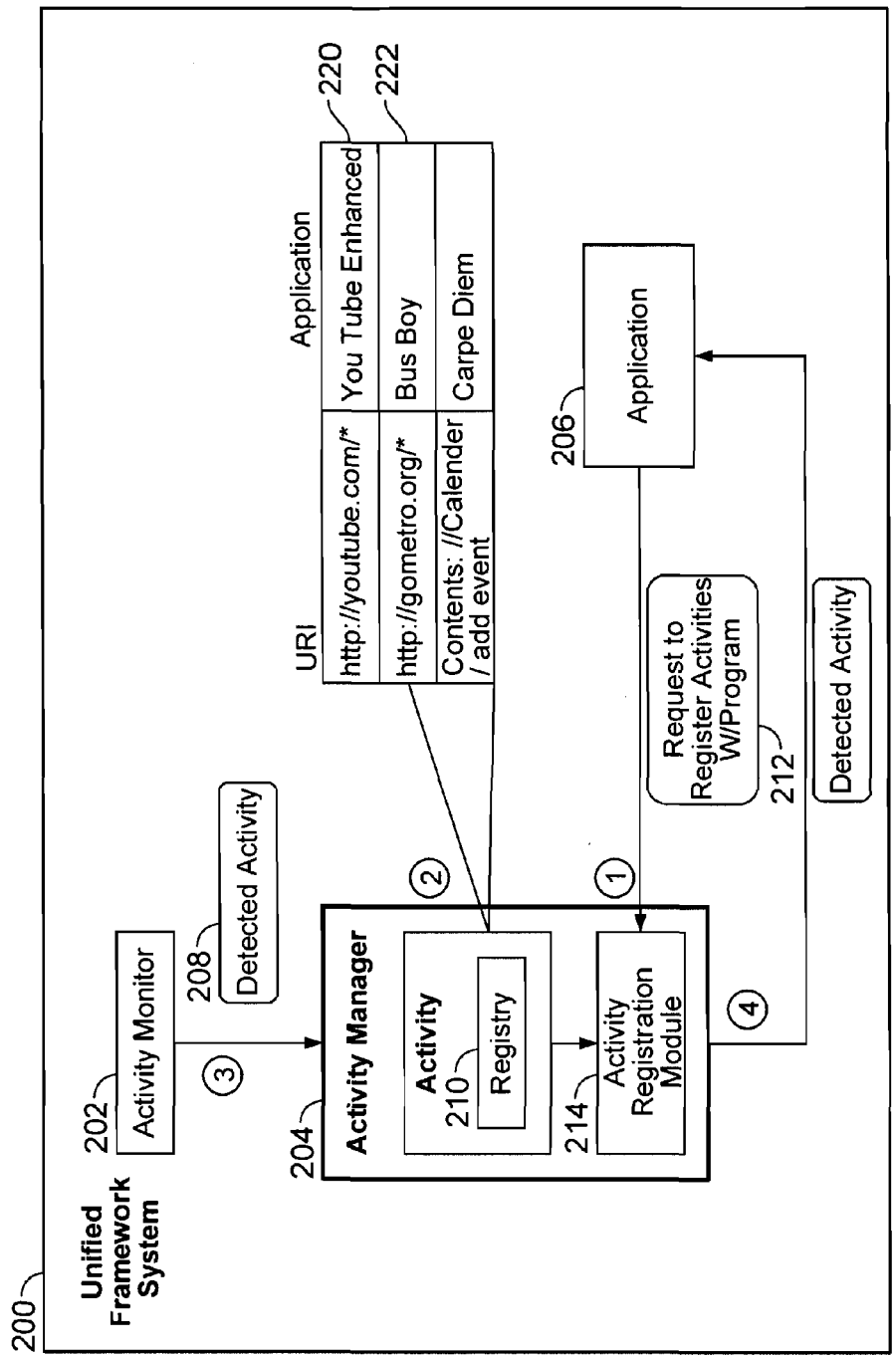
FIG. 2 is a block diagram of an exemplary system having components for associating a presentation layer for a web page with a non-browser application.

FIG. 2 is a block diagram of an exemplary unified framework system 200 having components for associating a presentation layer for a web page with a non-browser application. The unified framework system includes an activity monitor 202, an activity manager 204, at least one application 206.

When an application 206 is installed on a device that includes the unified framework system 200, the application 206 can initiate a request 212 to register the application with certain activities. For example, the application 206 can request to be associated with all activities that reference a particular URI.

The activity manager 204 can receive the requests to register the application with particular activities. For example, if the application 206 is entitled "YouTube Enhanced," the application 206 can request that it handle all URIs that include the pattern www.youtube.com/*, where the "*" indicates a wildcard that can stand for any number of characters. If an activity includes a reference to www.youtube.com, the activity will be forwarded to the YouTube Enhanced application for processing.

More specifically, the activity manager 204 can include an activity registration module 214 that receives the requests 212 and registers the application with an activity registry 210. For example, the activity registration module 214 can create the association between the YouTube Enhanced application and the URI www.youtube.com URI by generating an entry 220 in the activity registry 210 as shown in FIG. 2.

Similarly several applications can be registered in the activity registry, each associated with different URIs. For example, the application titled "Bus Boy" is associated with the URI www.gometro.org/* in a registry entry 222 so that when this URI is selected, instead of opening a web browser to display the web page www.goMetro.org, the "Bus Boy" application is executed. In another example, an application titled "Carpe Diem" is associated with a URI content://calendar/add_event in a registry entry 224. In the example of FIG. 2, this URI instructs the Carpe Diem application to access locally stored calendar data and initiate the addition of a new event to the calendar data.

In some implementations, the activity monitor 202 detects the occurrence of activities associated with URIs, such as a user selection of a URI. The activity monitor 202 transmits information about the activity 208 (e.g., the URI) to the activity manager 204. The activity manager 244, in turn, can identify an application associated with the URI using the activity registry 210 as previously described. The activity manager 204 then can transmit the URI to the identified application, which can process the URI (e.g., parse the URI to determine an appropriate action and then take the action).

The numerically labeled arrows in FIG. 2 indicate one possible sequence of events, where an application is installed and requests to be registered (1), the application is associated with certain URIs (2), the activity monitor 202 detects an activity having an associated URI (3), and an appropriate application is identified based on the registry entries and the URI is sent to the identified application (4).

Figure 3:
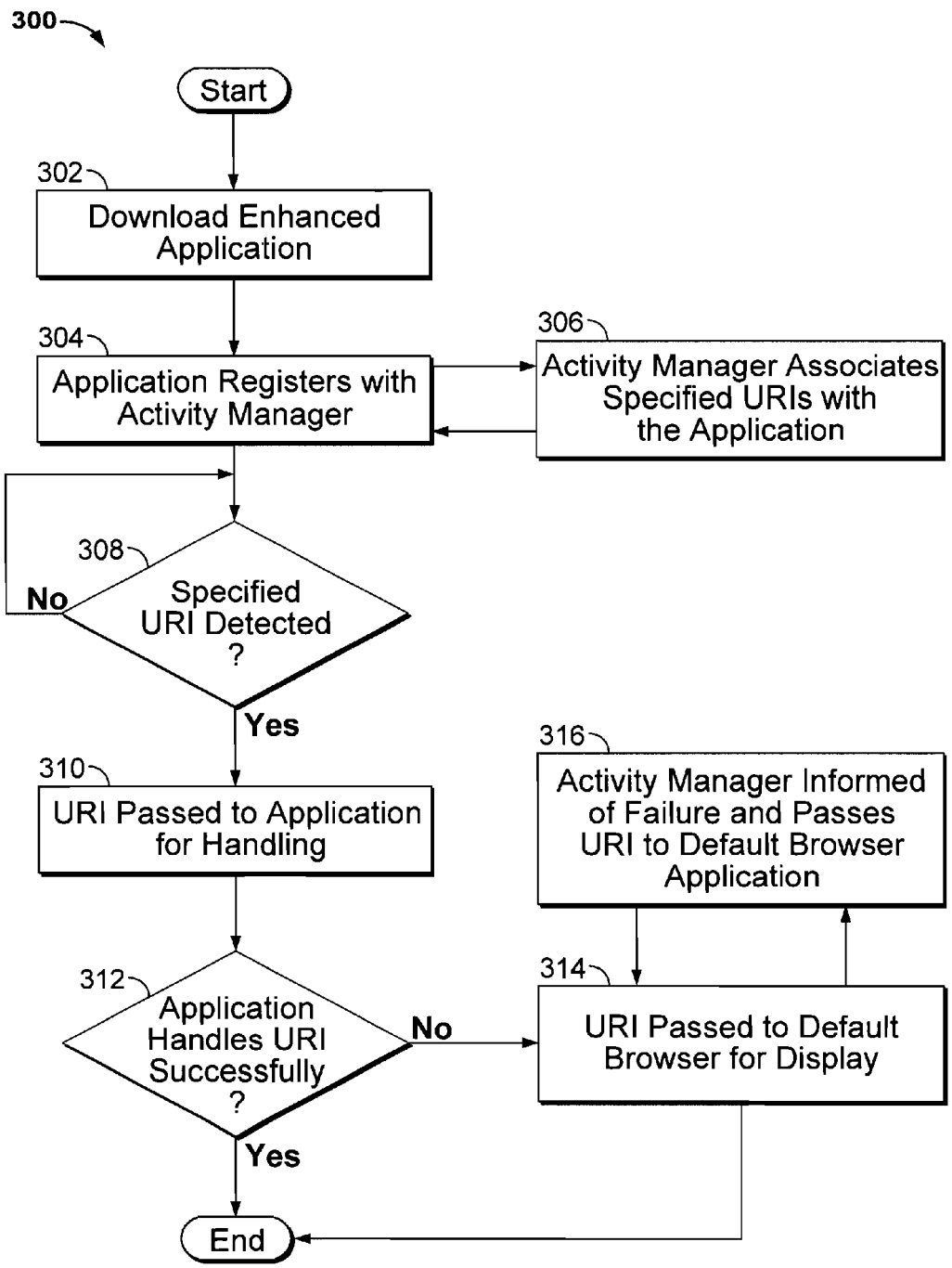
FIG. 3 is a flow chart of an exemplary method for associating a presentation layer for web page with a non-browser application.

FIG. 3 is a flow chart of an exemplary method for associating a presentation layer for web page with a non-browser application. The method 300 may be performed, for example, by a system such as the systems 100, 150 and 200, but for clarity of presentation, the description that follows uses the system 200 as the basis of an example for describing the methods. However, another system, or combination of systems, may be used to perform the method 300.

In step 302, an enhanced application is downloaded. In some implementations, an enhanced application refers to a native non-browser application that intercepts URIs that specify one or more web pages and that retrieves contents of the web pages for display within the application. In some implementations, the enhanced application associated with a web page can be downloaded when a user visits the web page. For example, if a user visits the YouTube web page, the user may be prompted to download an enhanced application that will intercept future URIs that specify the web domain www.youtube.com.

In step 304, an application is registered. In some implementations, the application is associated with one or more URIs. For example, the activity manager 204 can register the application with the URIs in the activity registry 210, as indicated by the step 306.

In step 308, it is determined whether an activity associated with a particular URI is detected. For example, the activity monitor 202 can monitor user actions to determine if a user selects a user interface element associated with a URI. In another example, the activity monitor 202 can monitor application actions to determine if an application running on the unified framework system 200 has initiated an event that includes a URI. If no activity associated with a URI is detected, the monitoring continues. If an activity is detected, the method performs step 310.

In step 310, the detected URI is passed to an application for handling. For example, the activity manager 204 identifies an application associated with the activity using the activity registry 210 and transmits the detected URI to the identified application.

In step 312, it is determined whether the application is able to successfully handle an action initiated by reception of the URI. In some implementations, the URI can identify a web page. If the identified application receives unexpected content in response to a request for content from the web page, the application may be unable to successfully display the content or information derived from the content. For example, if the application's request includes a request for content present in a hypertext markup language (HTML) table located at the top of a web page, it may receive unexpected data if the HTML table has been moved to a different part of the page (or removed all together). If the application cannot successfully handle an action initiated by receipt of the URI, step 314 is performed. Otherwise the method 300 can end.

In step 314, the URI can be passed to a default application for processing. For example, if the URI specifies a web page, the URI can be passed to a browser and the web page can be simply displayed as a web page in the browser. In some implementations, the URI is passed to the default application via the activity manager, which can temporarily or permanently reassign the URI to the default application, as indicated in step 316. After step 314, the method can end.

Figure 4A:
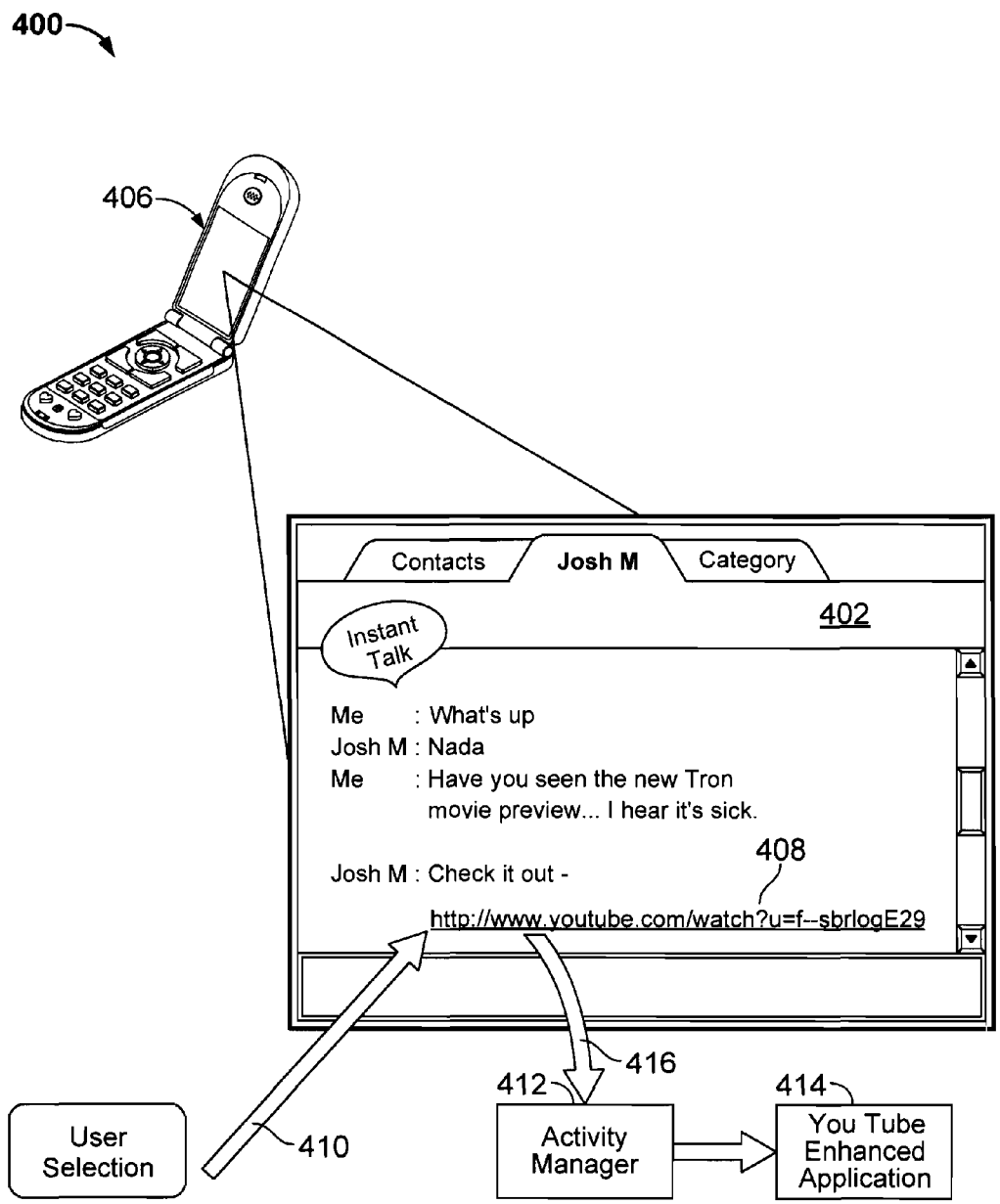
FIGS. 4A and 4B are schematic diagrams of an exemplary system where an activity associated with a URI originates in a first application, but is handled by a second application.
Figure 4B:
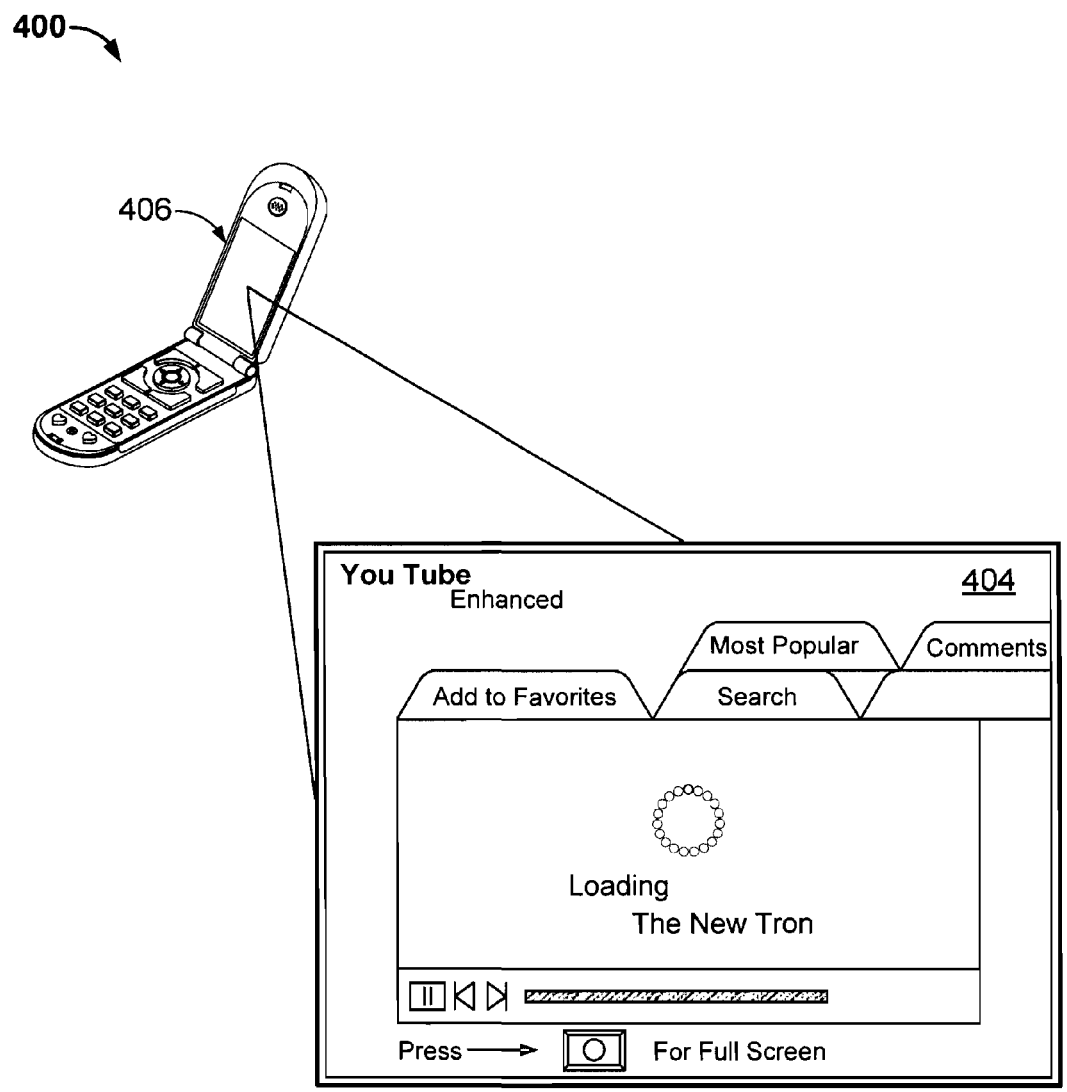

FIGS. 4A and 4B are schematic diagrams of an exemplary system 400 where an activity associated with a URI originates in a first application 402, but is handled by a second application 404. The exemplary first application 402 shown in FIG. 4A is an instant messaging application running on a mobile device 406. As shown in the exemplary screenshot, the user of the mobile device 406 is chatting with a contact "JoshM".

The contact "JoshM" sends a URI 408. In the present example, the URI 408 is a hypertext link to a video hosted at the www.youtube.com website. The user of the device 406 can select the URI 408 as indicated by the arrow 410. Upon selection of the URI 408, the URI is passed to the activity manager 412 as indicated by an arrow 416. The activity manager 412 can determine that the URI is associated with an application "YouTubeEnhanced" 404. The URI then can be passed to the "YouTubeEnhanced" application 404 for processing, which is described in association with FIG. 4B.

FIG. 4B shows an exemplary screenshot of the "YouTubeEnhanced" application 404. The application can process the URI 408 received from the activity manager 412. In the illustrative implementation, the processing includes parsing the URI 408 to determine a video associated with the URI 408. In this case the URI 408 is appended with the information "watch?v=f--sbr10GE29." The "YouTubeEnhanced" application 404 uses this information to send a request for a video associated with the appended information to a YouTube web server (not shown). In response, the YouTube web server transmits video information to the "YouTubeEnhanced" application 404.

Using the video information, the "YouTubeEnhanced" application 404 can instruct a media player application (also hosted on the device 406) via a media player application programming interface (API) to display the video on the device 406. In association with playing the video, the "YouTubeEnhanced" application 404 also can request via a graphics API that video controls be drawn on the screen. For example, the video controls can include a play button, rewind and fast-forward controls, and a progress bar. Additionally the "YouTubeEnhanced" application 404 can request that a button be drawn on the screen that causes the video to fill the entire display of the device 406 when a user presses the button. User interface (UI) elements that are drawn using the "YouTubeEnhanced" application 404 may or may not correspond to UI elements that are present on the web page hosting the video on the YouTube web server.

In this example, the YouTube URI 408 is "intercepted" by the "YouTubeEnhanced" application 404, which displays the video instead of having selection of the URI 408 trigger a browser application to load the YouTube web page. In some implementations, this may provide a more seamless transition. For example, the "YouTubeEnhanced" application 404 can be optimized for display on small screen devices, while the YouTube web page may not be easily viewed on a small screen. In another example, the instant messaging application 402 and the "YouTubeEnhanced" application 404 may have a more similar look and feel relative to the look and feel of the YouTube web page viewed using a browser application.

Figure 5A:
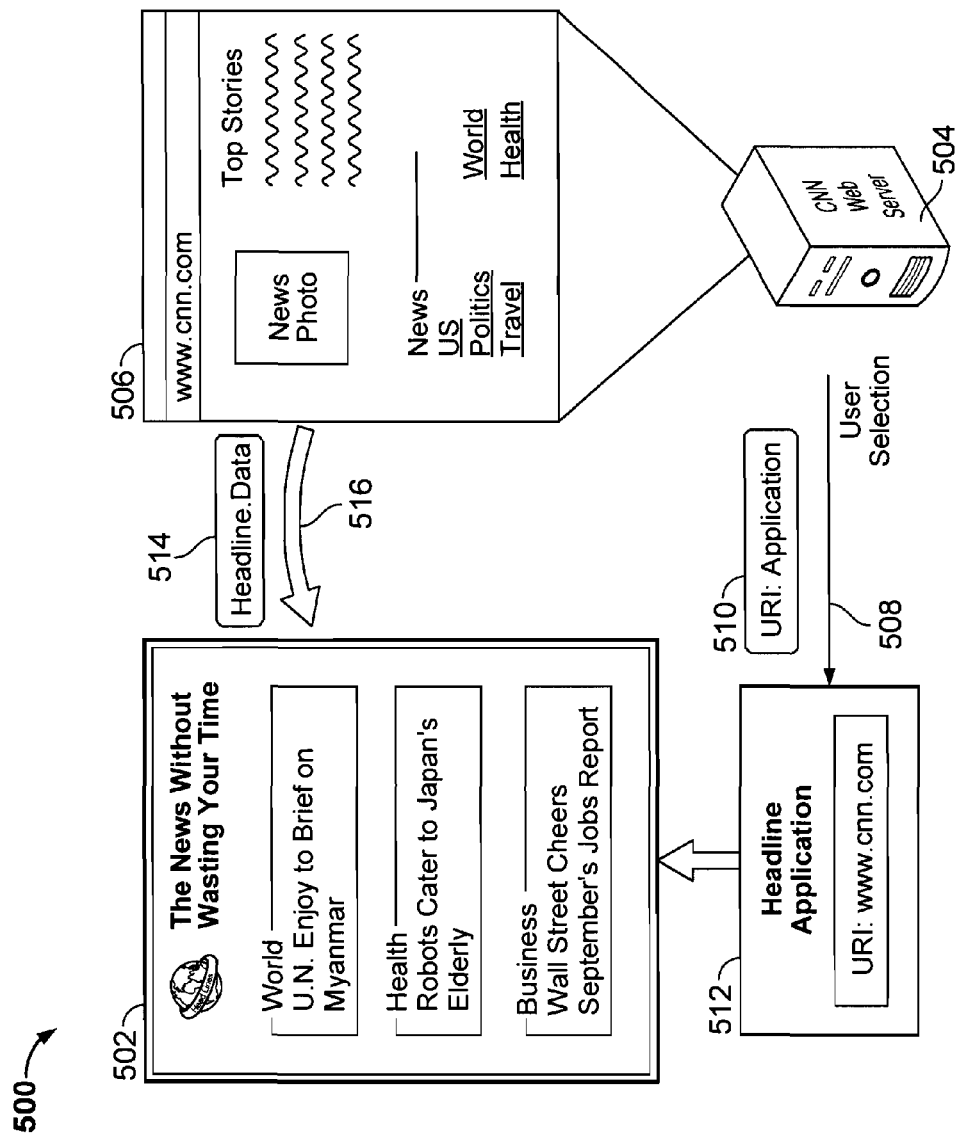
FIGS. 5A and 5B are schematic diagrams of an exemplary non-browser application that accesses a web page or internally stored content.
Figure 5B:
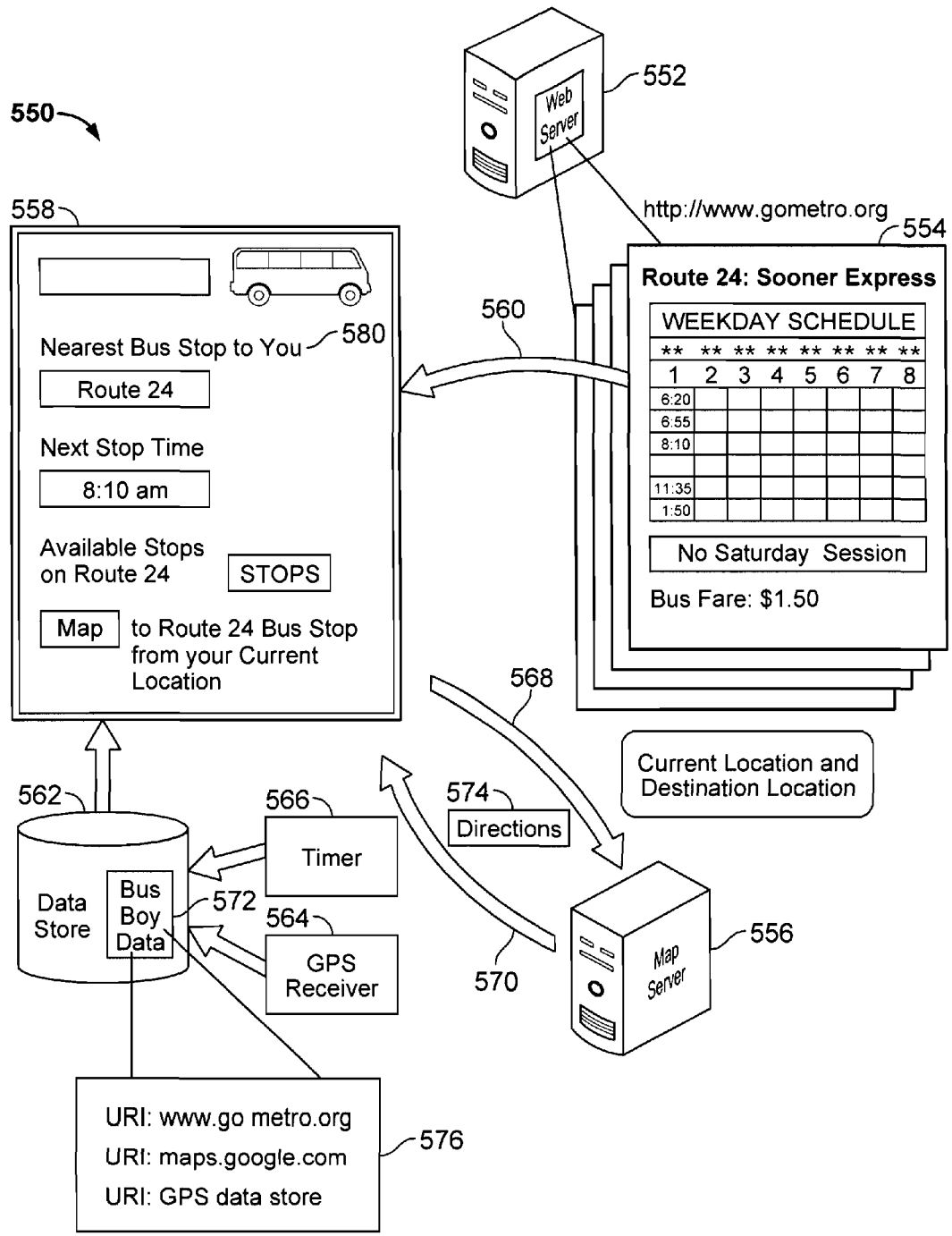

FIGS. 5A and 5B are schematic diagrams of an exemplary non-browser application that accesses a web page or internally stored content. FIG. 5A shows an exemplary system 500 that shows a screenshot of a headline news application 502 and a web server 504 that hosts a web page 506. In some implementations, the headline news application can be accessed using an icon displayed on a UI of a mobile device (not shown).

When a user selects the icon, the headline application 502 is opened as indicated by an arrow 508. As part of the execution of the headline application 502, a URI 510 can be selected. For example, when the headline news application 502 is selected an activity can occur that is associated with the URI 510, which specifies a location of the headline news application 502 within local memory. The headline news application 502, in turn can initiate an activity that is associated with a second URI 512 that specifies a web page of a news site such as www.cnn.com.

The headline news application can use the second URI 512 to request content from the CNN web server 504. For example, the requested content can include headline data 514 (e.g., top news headlines) from the CNN web site 506. The headline data 514 then can be transmitted to the headline news application 502 as indicated by an arrow 516.

In the exemplary headline news application 502, only the news headlines are displayed to a user viewing the headline news application 502. For example, under the "World" news category, the headline "UN Envoy to Brief on Myanmar" is displayed without the accompanying article. Similarly, under the "Health" news category, only the headline "Robots Cater to Japan's Elderly" is displayed. In some implementations the font and presentation of the content retrieved from the web site 506 is modified. For example, the font can be resized and colored differently so that it is more easily viewed on a small screen device.

In certain implementations, the headline news application can also be launched whenever a URI associated with the web site www.cnn.com is selected (or associated with another activity that occurs on a device in which the headline news application is installed).

FIG. 5B shows an exemplary system 550 that includes a web server 552 that has web pages 554 that include bus schedule information, a map server 556 that provides location and direction information, and an application 558 titled "Bus Boy" that is installed on a user device (not shown). When the "Bus Boy" application 558 is launched (e.g., a user selects an icon for the "Bus Boy" application 558 or a URI that specifies one or more of the web pages 554 is included in activity that occurs on the device), an exemplary series of actions can be initiated.

In the first action, the "Bus Boy" application 558 can request bus schedule content from the web pages 554 hosted by the web server 552. The return of the bus schedule content to the "Bus Boy" application 558 is indicated by an arrow 560. Substantially in parallel, a second action can be initiated in which the "Bus Boy" application 558 accesses global positioning system "GPS" data gathered by a GPS receiver 564 of the device. Additionally, the "Bus Boy" application 558 can gather timer information such as a current date and time from a timer 566 that is included in the device.

Additionally as indicated by an arrow 568, a third action can be initiated where the map server 556 is queried using the current location determined by the GPS data and the bus stop locations indicated by the bus schedule content. The map server 556—in response—can return map information such as directions from the current location of the device to one or more bus stop locations indicated by the bus schedule content. This transfer of information from the map server to the "Bus Boy" application 558 is indicated by an arrow 570.

Using the GPS and timer information, the bus schedule content, and the direction information returned by the map server 556, the "Bus Boy" application 558 can display information such as shown in the exemplary screenshot of FIG. 5B. For example, the "Bus Boy" application 558 can display the nearest bus stop to the device 580 using the GPS data to provide a current location for the device, the bus schedule content to provide locations of bus stops, and the directions from the map server 556 to calculate distances between the device location and various bus stop locations.

In another example, the "Bus Boy" application 558 can determine what the next bus stop time is for the previously determined nearest bus stop location. For example, the "Bus Boy" application 558 can use the timer's 566 information to determine a current time and the bus schedule content to determine when the next bus will be stopping at the nearest bus stop location. In another example, the "Bus Boy" application 558 can also use the direction information 574 from the map server 556 to display a map from the device's current position (as indicted by the GPS data) to the nearest bus stop to the device.

In some implementations, the web server 552 hosting the bus schedule content, the map server 556, and the GPS and timer data, can be identified using URIs 576 that are associated with the "Bus Boy" application 558. For instance, when the "Bus Boy" application 558 is executed, data from a "Bus Boy" application file 572 can be loaded, where the file includes the URIs 576 for the various entities discussed.

Figure 6A:
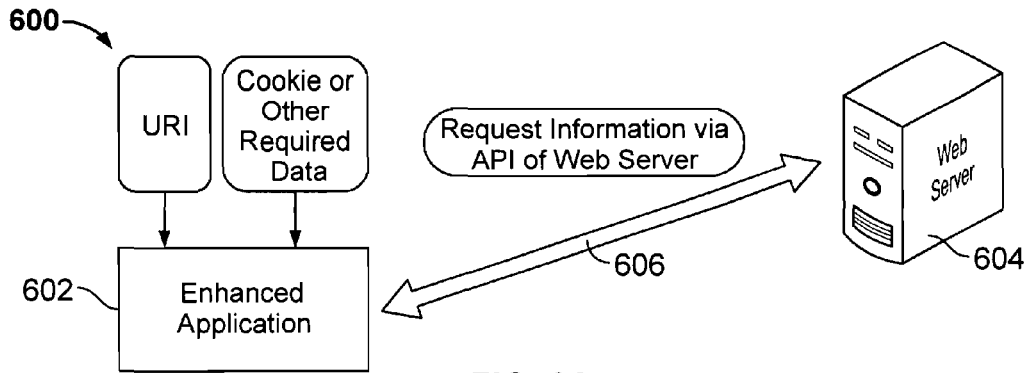
FIGS. 6A-6C are schematic diagrams that show exemplary methods of requesting web page content from a server for display in a non-browser application.
Figure 6B:
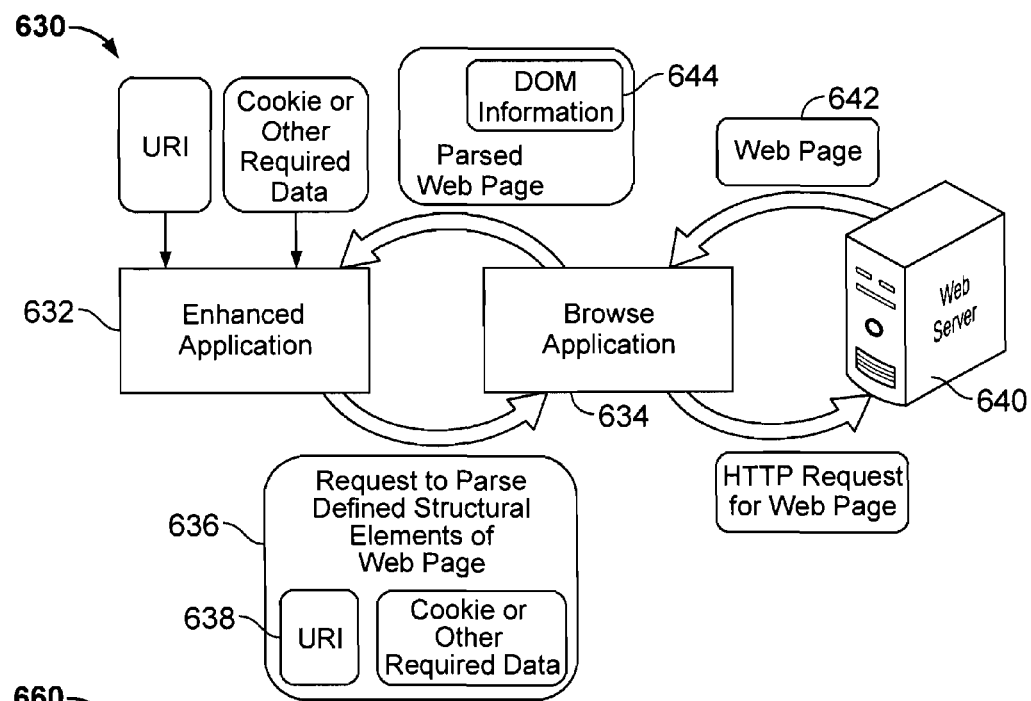
Figure 6C:
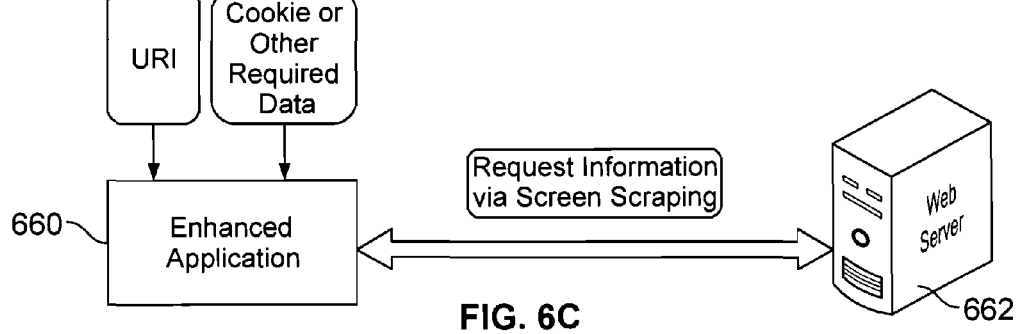

FIGS. 6A-6C are schematic diagrams that show exemplary methods of requesting web page content from a server for display in a non-browser application. FIG. 6A shows a first implementation 600, where an enhanced application 602 installed on a device (not shown) requests data from a web server 604 via an API defined by the web server as indicated by an arrow 606. For example, if the web server is a www-.flickr.com web server, the API can define method calls used to upload photos, view a picture gallery, login to the web server, etc. In some implementations, the enhanced application 602 initiates a request for information via the API upon receiving a URI that specifies the web server. The enhanced application can also pass information to the web server that is required, for example, to authenticate a user. In some implementations, the authentication information can include a cookie that has information that identifies the user or information about the user.

FIG. 6B shows another implementation 630, in which an enhanced application 632 requests that a web browser application 634 (e.g., installed on the same device as the enhanced application 632) parse structural elements of a web page and return the parsed structural elements. The enhanced application 632 can use the parsed structural elements of the web page to extract content that is displayed or otherwise processed by the enhanced application 632.

For example, the enhanced application 632 can transmit a request 536 to the browser application 634 to parse elements of a web page at a particular URI 638 specified by the enhanced application. The web page can transmit a hypertext transport protocol ("HTTP") request for the web page to the web server 640, which in response transmits a web page 642 to the browser application 634. The browser application 634 can parse the web page 642 to extract structural information, such as document object model (DOM) information 644. The web browser 634 then transmits the DOM information 644 to the enhanced application 632 for extraction of content.

In yet another implementation 660, shown by the FIG. 6C, an enhanced application 660 performs a "screen scrape" upon a web page hosted by a web server 662. For example, screen scraping can include requesting raw HTML data for a web page specified by a URI. The enhanced application can search the raw HTML in an attempt to locate the desired content. If the desired content is located, it can be displayed or otherwise processed by the enhanced application 660.

Figure 7A:
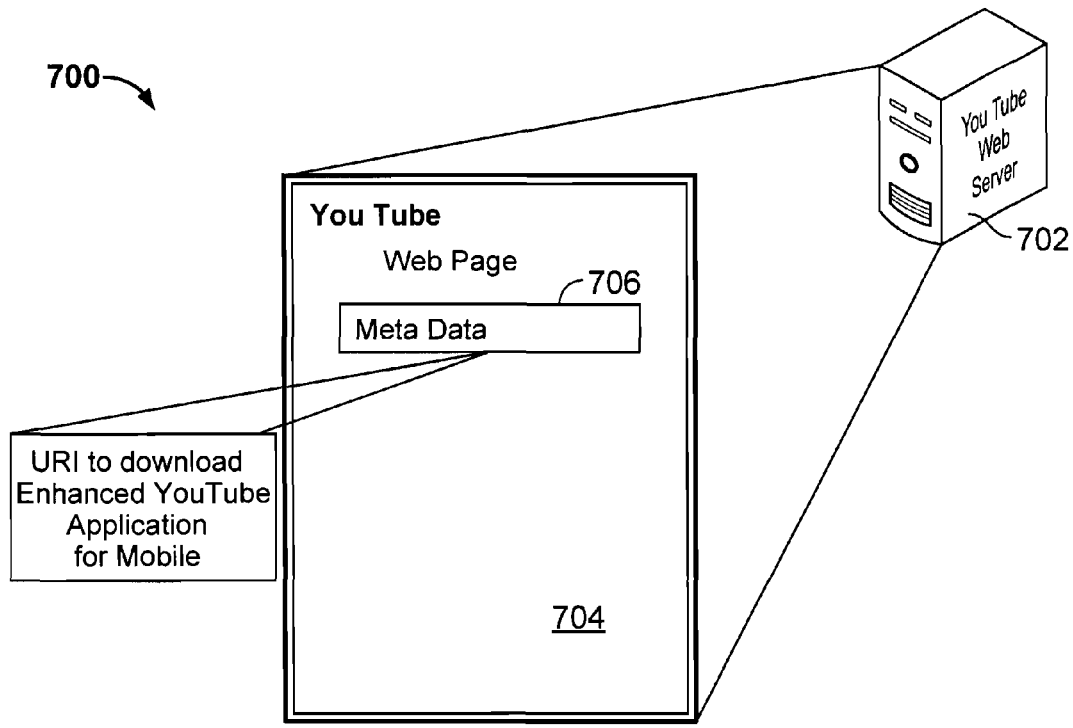
FIGS. 7A and 7B are schematic diagrams that show an exemplary method for downloading a non-browser application used to display web content.
Figure 7B:
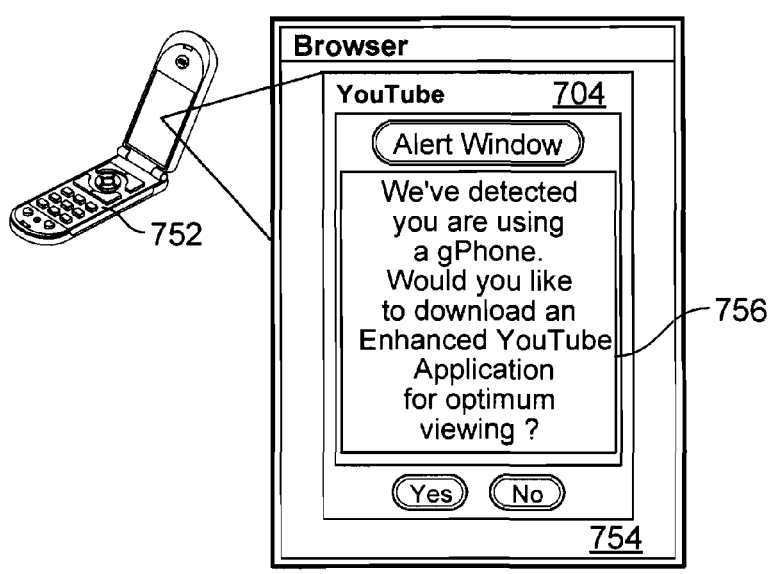

FIGS. 7A and 7B are schematic diagrams that show an exemplary method for downloading a non-browser application used to display web content. FIG. 7A shows a system 700 that includes a web server 702 (e.g., the www.youtube.com web server). The web server can host a web page 70 (e.g., a YouTube web page). The web page 704 can include metadata 706, which in turn includes a URI that specifies a location where an "enhanced" YouTube application for mobile devices can be downloaded. The metadata also can include information such as different URIs that specify different download packages for different mobile devices. Additionally, in some implementations, the metadata 706 itself can include a download package used to install the enhanced YouTube application.

FIG. 7B shows a system 750 that includes a mobile device 752 that has a browser application 754. When the browser application 754 requests the YouTube web page 704, the browser application can access the metadata 706 to generate an alert window 756 that indicates an enhanced YouTube application is available for download for the mobile device 752.

In some implementations, different versions of the enhanced YouTube application can be downloaded based on the type of mobile device that is viewing the web page 704. For example, some versions of the application can be optimized for mobile devices with certain screen resolutions, screen sizes, or other characteristics, such as an ability to execute JavaScript or the data service provider for the mobile device (e.g., whether the data service provider is Sprint, AT&T, etc.).

The web server 207 can detect the type of device based on information transmitted in the requests for the web page 744 and can display an alert window 756 suggesting a download of the appropriate enhanced application. After downloading the enhanced application, the enhanced application may subsequently display content from one or more web pages hosted at the web server 702 instead of displaying the web pages in a web browser application.

Figure 8:
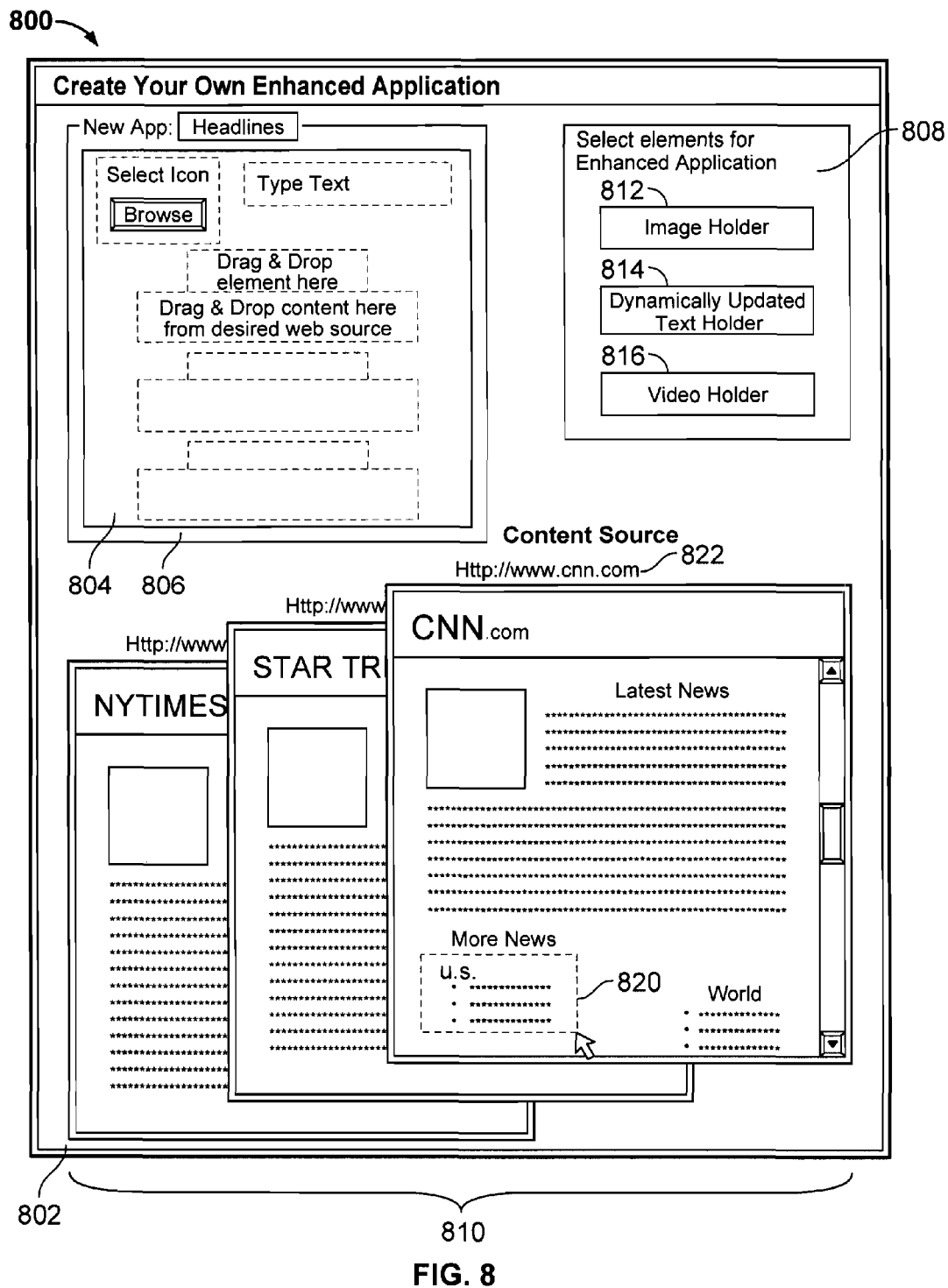
FIG. 8 is an exemplary screen shot of a design application used to design a non-browser application that displays web content associated with a particular URI.

FIG. 8 is an exemplary screenshot 800 of a design application 802 used to design a non-browser application 804 that displays web content associated with one or more particular URIs. Within the screenshot 800, the design application 802 displays several windows. A new application window 806 shows a new application 804 under design. An element window 808 includes elements that can be used to design the new application 804. Other web page windows 810 include displayed web pages associated with user-specified URIs.

In certain implementations, a user of the design application 802 can select UI elements from the element window 808 such as an image holder 812, a dynamically updated text holder 814, or video holder 816. The user can drag-and-drop (or otherwise add) selected elements to a palette of the new application 804. A user also can specify URIs 822 that the design application uses to display web pages 810 associate with the URIs 822. For example, the user can enter the URI www.cnn.com, which the design application uses to display the corresponding CNN webpage.

In the example of FIG. 8, the user can select content from the CNN.com web page using a cursor dragged over the desired text (as indicated by the dashed lines surrounding the text under the "More News" section 820. The user can then drag-and-drop (or otherwise add) the selected text to an element of the new application 804. For example, the text can be dragged-and-dropped into a dynamically updated text holder element present in the new application 844. After the application 804 is completed, the text on the CNN web site can be automatically retrieved by the new application for display within the dynamically updated text holder. The text can be updated dynamically when the text changes on the CNN web site because the text itself is not specified but instead the area or an element associated with the text on the CNN web page is specified.

Figure 9:
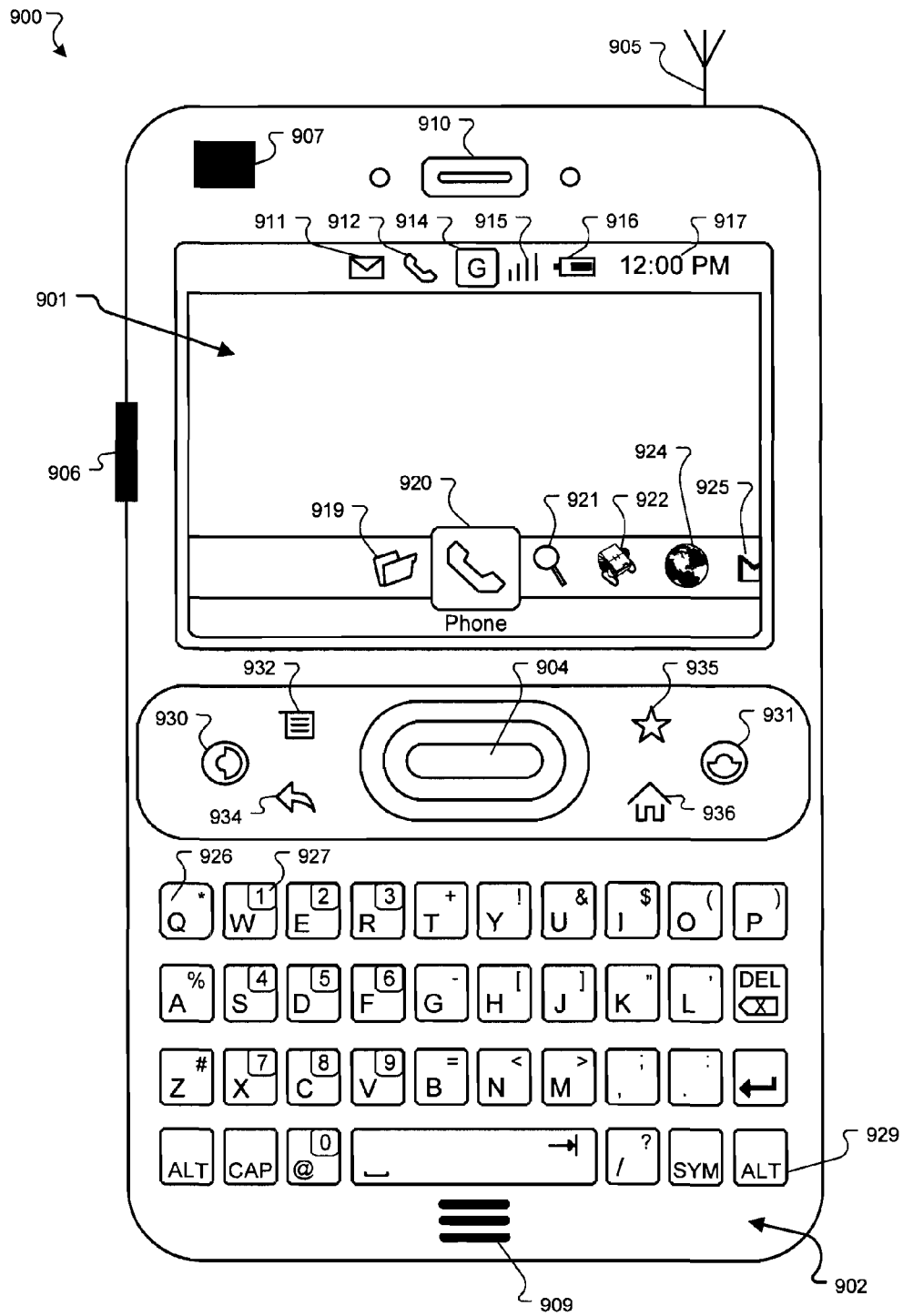
FIG. 9 is a schematic representation of an exemplary mobile device that implements embodiments of the unified framework feature described herein.

Referring now to FIG. 9, the exterior appearance of an exemplary device 900 that implements the unified framework feature is illustrated. Briefly, and among other things, the device 900 includes a processor configured to intercept URIs for web pages and cause content from the web pages to be retrieved and displayed using a non-browser application upon request of a user of the mobile device.

In more detail, the hardware environment of the device 900 includes a display 901 for displaying text, images, and video to a user; a keyboard 902 for entering text data and user commands into the device 900; a pointing device 904 for pointing, selecting, and adjusting objects displayed on the display 901; an antenna 905; a network connection 906; a camera 907; a microphone 909; and a speaker 910. Although the device 900 shows an external antenna, the device 900 can include an internal antenna, which is not visible to the user.

The display 901 can display video, graphics, images, and text that make up the user interface for the software applications used by the device 900, and the operating system programs used to operate the device 900. Among the possible elements that may be displayed on the display 901 are a new mail indicator 911 that alerts a user to the presence of a new message; an active call indicator 912 that indicates that a telephone call is being received, placed, or is occurring; a data standard indicator 914 that indicates the data standard currently being used by the device 900 to transmit and receive data; a signal strength indicator 915 that indicates a measurement of the strength of a signal received by via the antenna 905, such as by using signal strength bars; a battery life indicator 916 that indicates a measurement of the remaining battery life; or a clock 917 that outputs the current time.

The display 901 may also show application icons representing various applications available to the user, such as a web browser application icon 919, a phone application icon 920, a search application icon 921, a contacts application icon 922, a mapping application icon 924, an email application icon 925, or other application icons. In one example implementation, the display 901 is a quarter video graphics array (QVGA) thin film transistor (TFT) liquid crystal display (LCD), capable of 16-bit or better color.

A user uses the keyboard (or "keypad") 902 to enter commands and data to operate and control the operating system and applications that provide for selecting or initiating actions that include URIs, which are used to display, etc. content in a non-browser application. The keyboard 902 includes standard keyboard buttons or keys associated with alphanumeric characters, such as keys 926 and 927 that are associated with the alphanumeric characters "Q" and "W" when selected alone, or are associated with the characters "*" and "1" when pressed in combination with key 929. A single key may also be associated with special characters or functions, including unlabeled functions, based upon the state of the operating system or applications invoked by the operating system. For example, when an application calls for the input of a numeric character, a selection of the key 927 alone may cause a "1" to be input.

In addition to keys traditionally associated with an alphanumeric keypad, the keyboard 902 also includes other special function keys, such as an establish call key 930 that causes a received call to be answered or a new call to be originated; a terminate call key 931 that causes the termination of an active call; a drop down menu key 932 that causes a menu to appear within the display 901; a backwards navigation key 934 that causes a previously accessed network address to be accessed again; a favorites key 935 that causes an active web page to be placed in a bookmarks folder of favorite sites, or causes a bookmarks folder to appear; a home page key 936 that causes an application invoked on the device 900 to navigate to a predetermined network address; or other keys that provide for multiple-way navigation, application selection, and power and volume control.

The user uses the pointing device 904 to select and adjust graphics and text objects displayed on the display 901 as part of the interaction with and control of the device 900 and the applications invoked on the device 900. The pointing device 904 is any appropriate type of pointing device, and may be a joystick, a trackball, a touch-pad, a camera, a voice input device, a touch screen device implemented in combination with the display 901, or any other input device.

The antenna 905, which can be an external antenna or an internal antenna, is a directional or omni-directional antenna used for the transmission and reception of radiofrequency (RF) signals that implement point-to-point radio communication, wireless local area network (LAN) communication, or location determination. The antenna 905 may facilitate point-to-point radio communication using the Specialized Mobile Radio (SMR), cellular, or Personal Communication Service (PCS) frequency bands, and may implement the transmission of data using any number or data standards. For example, the antenna 905 may allow data to be transmitted between the device 900 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access (CDMA2000), Wideband Integrated Dispatch Enhanced Network (WIDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM chipset with an QUALCOMM transceiver and power management circuit.

The wireless or wireline computer network connection 906 may be a modem connection, a local-area network (LAN) connection including the Ethernet, or a broadband wide-area network (WAN) connection such as a digital subscriber line (DSL), cable high-speed Internet connection, dial-up connection, T-1 line, T-3 line, fiber optic connection, or satellite connection. The network connection 906 may connect to a LAN network, a corporate or government WAN network, the Internet, a telephone network, or other network.

The network connection 906 uses a wireline or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wireline connectors include, for example, a IEEE FIREWIRE connector, a Universal Serial Bus (USB) connector (including a mini-B USB interface connector), a serial port connector, a parallel port connector, or other wireline connector. In another implementation, the functions of the network connection 906 and the antenna 905 are integrated into a single component.

The camera 907 allows the device 900 to capture digital images, and may be a scanner, a digital still camera, a digital video camera, other digital input device. In one example implementation, the camera 907 is a 3 mega-pixel (MP) camera that utilizes a complementary metal-oxide semiconductor (CMOS).

The microphone 909 allows the device 900 to capture sound, and may be an omni-directional microphone, a unidirectional microphone, a bi-directional microphone, a shotgun microphone, or other type apparatus that converts sound to an electrical signal. The microphone 909 may be used to capture sound generated by a user, for example when the user is speaking to another user during a telephone call via the device 900. Conversely, the speaker 910 allows the device to convert an electrical signal into sound, such as a voice from another user generated by a telephone application program, or a ring tone generated from a ring tone application program. Furthermore, although the device 900 is illustrated in FIG. 9 as a handheld device, in further implementations the device 900 may be a laptop, a workstation, a midrange computer, a mainframe, an embedded system, telephone, desktop PC, a tablet computer, a PDA, or other type of computing device.

Figure 10:
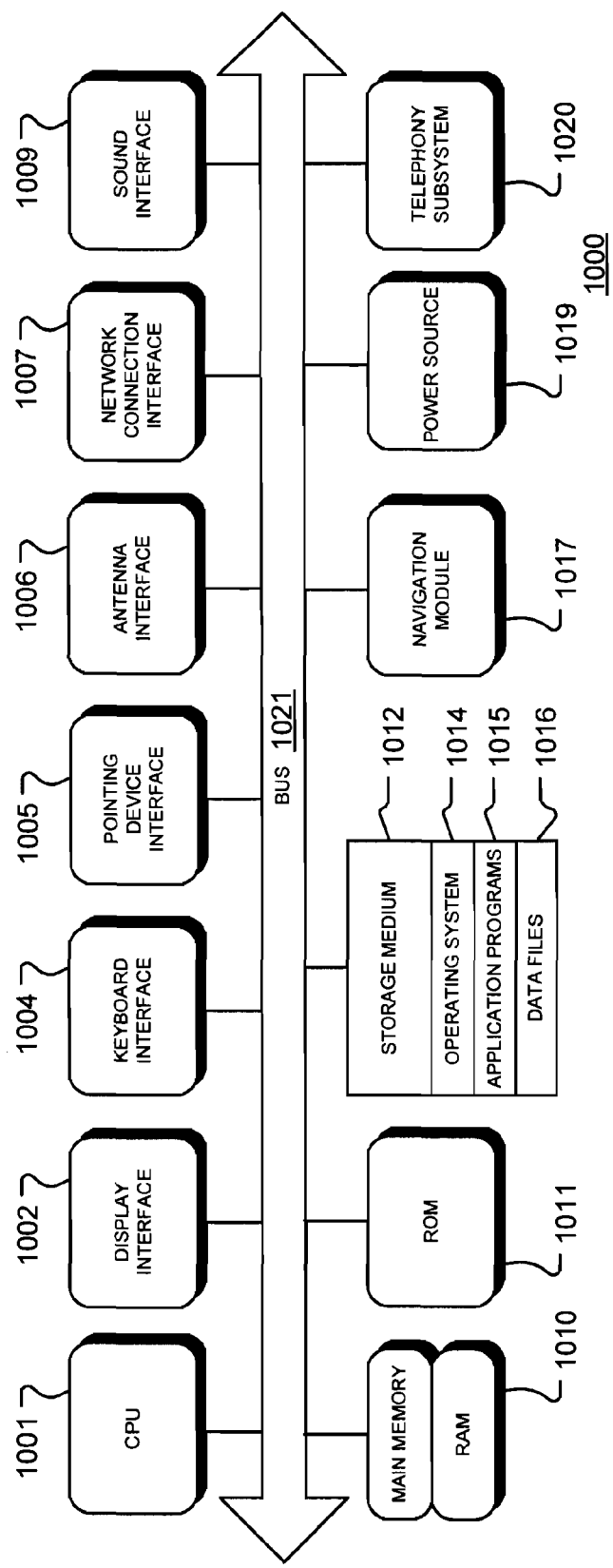
FIG. 10 is a block diagram illustrating the internal architecture of the device of FIG. 9.

FIG. 10 is a block diagram illustrating an internal architecture 1000 of the device 900. The architecture includes a central processing unit (CPU) 1001 where the computer instructions that comprise an operating system or an application are processed; a display interface 1002 that provides a communication interface and processing functions for rendering video, graphics, images, and texts on the display 901, provides a set of built-in controls (such as buttons, text and lists), and supports diverse screen sizes; a keyboard interface 1004 that provides a communication interface to the keyboard 902; a pointing device interface 1005 that provides a communication interface to the pointing device 904; an antenna interface 1006 that provides a communication interface to the antenna 905; a network connection interface 1007 that provides a communication interface to a network over the computer network connection 906; a camera interface 1009 that provides a communication interface and processing functions for capturing digital images from the camera 907; a sound interface that provides a communication interface for converting sound into electrical signals using the microphone 909 and for converting electrical signals into sound using the speaker 910; a random access memory (RAM) 1010 where computer instructions and data are stored in a volatile memory device for processing by the CPU 1001; a read-only memory (ROM) 1011 where invariant low-level systems code or data for basic system functions such as basic input and output (I/O), startup, or reception of keystrokes from the keyboard 902 are stored in a non-volatile memory device; a storage medium 1012 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 1013, application programs 1015 (including, for example, a web browser application, a widget or gadget engine, and or other applications, as necessary) and data files 1019 are stored; a navigation module 1017 that provides a real-world or relative position or geographic location of the device 900; a power source 1019 that provides an appropriate alternating current (AC) or direct current (DC) to power components; and a telephony subsystem 1020 that allows the device 900 to transmit and receive sound over a telephone network. The constituent devices and the CPU 1001 communicate with each other over a bus 1021.

The CPU 1001 is one of a number of computer processors, including. In one arrangement, the computer CPU 1001 is more than one processing unit. The RAM 1010 interfaces with the computer bus 1021 so as to provide quick RAM storage to the CPU 1001 during the execution of software programs such as the operating system application programs, and device drivers. More specifically, the CPU 1001 loads computer-executable process steps from the storage medium 1012 or other media into a field of the RAM 1010 in order to execute software programs. Data is stored in the RAM 1010, where the data is accessed by the computer CPU 1001 during execution. In one example configuration, the device 900 includes at least 128 MB of RAM, and 256 MB of flash memory.

The storage medium 1012 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 900 to access computer-executable process steps, application programs and the like, stored on removable and non-removable memory media, to off-load data from the device 900, or to upload data onto the device 900.

A computer program product is tangibly embodied in storage medium 1012, a machine-readable storage medium. The computer program product includes instructions that, when read by a machine, operate to cause a data processing apparatus to store image data in the mobile device. In some embodiments, the computer program product includes instructions that associate a particular uniform resource identifier (URI) specifying a web page with a particular application that retrieves content from the web page and displays the content or information derived from the content in a first format that is not controlled by a second format specified by a markup language of the web page.

The operating system 1013 may be a LINUX-based operating system such as the ANDROID mobile device operating system; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 1013 may be: BINARY RUNT-IME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 1013, and the application programs 1015 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 1015 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, the GOOGLE gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for the unified framework feature using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 1021 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 1021 may also be used to measure angular displacement, orientation, or velocity of the device 900, such as by using one or more accelerometers.

Figure 11:
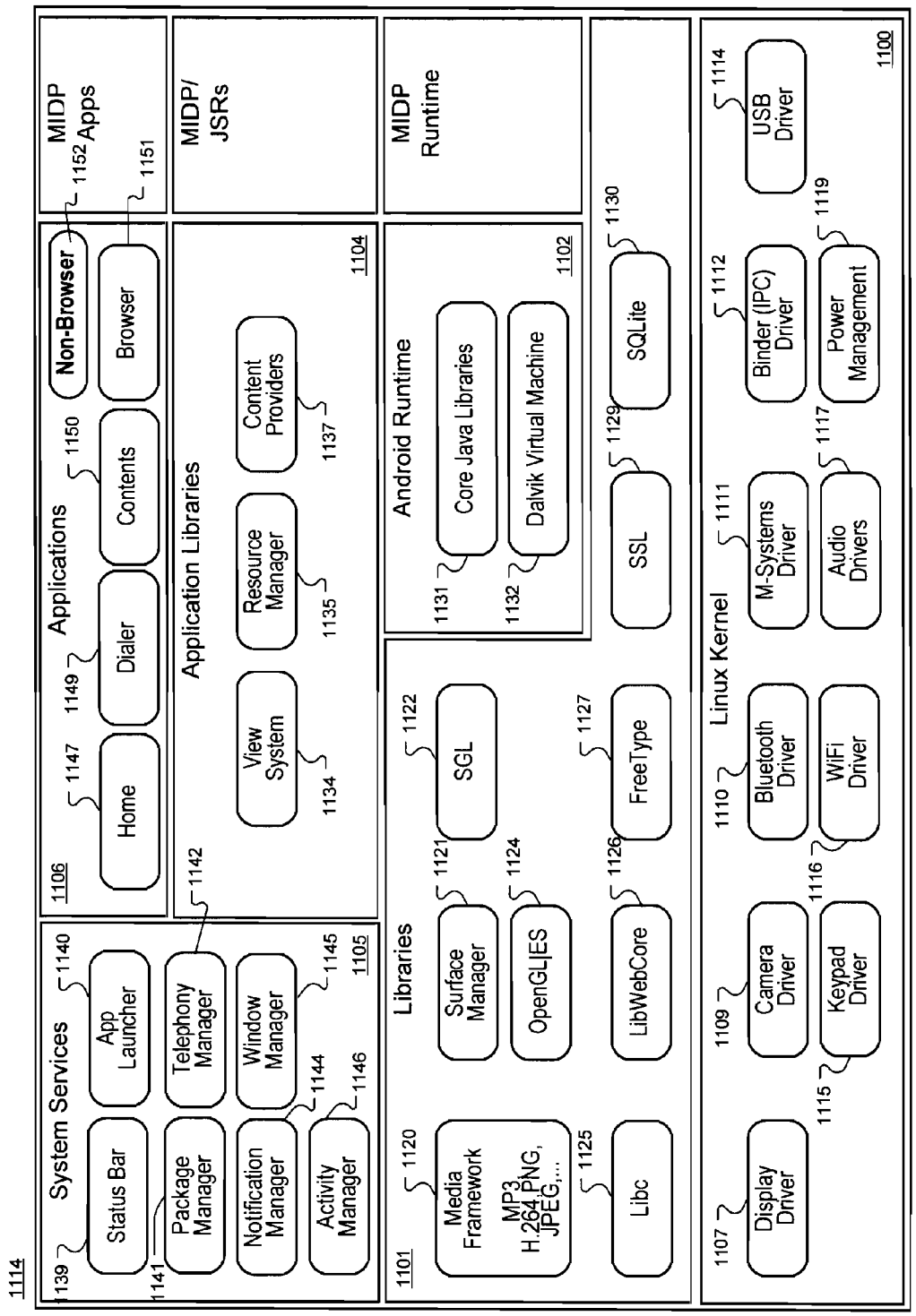
FIG. 11 is a block diagram illustrating exemplary components of the operating system used by the device of FIG. 9.

FIG. 11 is a block diagram illustrating exemplary components of the operating system 1113 used by the device 1100, in the case where the operating system 1113 is the ANDROID mobile device operating system. The operating system 1113 invokes multiple processes, while ensuring that the associated phone application is responsive, and that wayward applications do not cause a fault (or "crash") of the operating system. Using task switching, the operating system 1113 allows for the switching of applications while on a telephone call, without losing the state of each associated application. The operating system 1113 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 1113 can generally be organized into six components: a kernel 1100, libraries 1101, an operating system runtime 1102, application libraries 1104, system services 1105, and applications 1106. The kernel 1100 includes a display driver 1107 that allows software such as the operating system 1113 and the application programs 1115 to interact with the display 901 via the display interface 1102, a camera driver 1109 that allows the software to interact with the camera 907; a BLUETOOTH driver 1110; a M-Systems driver 1111; a binder (IPC) driver 1112, a USB driver 1114 a keypad driver 1115 that allows the software to interact with the keyboard 902 via the keyboard interface 1104; a WiFi driver 1116; audio drivers 1117 that allow the software to interact with the microphone 909 and the speaker 910 via the sound interface 1109; and a power management component 1119 that allows the software to interact with and manage the power source 1119.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or AudioNideo Remote Control Profile (AVRCP). The BLUETOOTH driver provides JAVA bindings for scanning, pairing and unpairing, and service queries.

The libraries 1101 include a media framework 1120 that supports standard video, audio and still-frame formats (such as Moving Picture Experts Group (MPEG)-4, H.264, MPEG-1 Audio Layer 5 (MP3), Advanced Audio Coding (AAC), Adaptive Multi-Rate (AMR), Joing Photographic Experts Group (JPEG), and others) using an efficient JAVA Application Programming Interface (API) layer; a surface manager 1121; a simple graphics library (SGL) 1122 for two-dimensional application drawing; an Open Graphics Library for Embedded Systems (OpenGL ES) 1124 for gaming and three-dimensional rendering; a C standard library (LIBC) 1125; a LIBWEBCORE library 1126; a FreeType library 1127; an SSL 1129; and an SQLite library 1130.

The operating system runtime 1102, which generally makes up a Mobile Information Device Profile (MIDP) runtime, includes core JAVA libraries 1131, and a Dalvik virtual machine 1132. The Dalvik virtual machine 1132 is a custom, virtual machine that runs a customized file format (.DEX).

The operating system can also include Mobile Information Device Profile (MIDP) components such as the MIDP JAVA Specification Requests (JSRs) components, MIDP runtime, and MIDP applications. The MIDP components can support MIDP applications.

With regard to graphics rendering, a system-wide composer manages surfaces and a frame buffer and handles window transitions, using the OpenGL ES 1124 and two-dimensional hardware accelerators for its compositions.

The Dalvik virtual machine 1132 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 1104 include a view system 1134, a resource manager 1135, and content providers 1137. The system services 1105 includes a status bar 1139; an application launcher 1140; a package manager 1141 that maintains information for all installed applications; a telephony manager 1142 that provides an application level JAVA interface to the telephony subsystem 1020; a notification manager 1144 that allows all applications access to the status bar and on-screen notifications; a window manager 1145 that allows multiple applications with multiple windows to share the display 901; and an activity manager 1146 that runs each application in a separate process, manages an application life cycle, and maintains a cross-application history.

The applications 1106, which generally make up the MIDP applications, include a home application 1147, a dialer application 1149, a contacts application 1150, a browser application 1151, and a non-browser application 1152.

The telephony manager 1142 provides event notifications (such as phone state, network state, Subscriber Identity Module (SIM) status, or voicemail status), allows access to state information (such as network information, SIM information, or voicemail presence), initiates calls, and queries and controls the call state. The browser application 1151 renders web pages in a full, desktop-like manager, including navigation functions. Furthermore, the browser application 1151 allows single column, small screen rendering, and provides for the embedding of HTML views into other applications.

Figure 12:
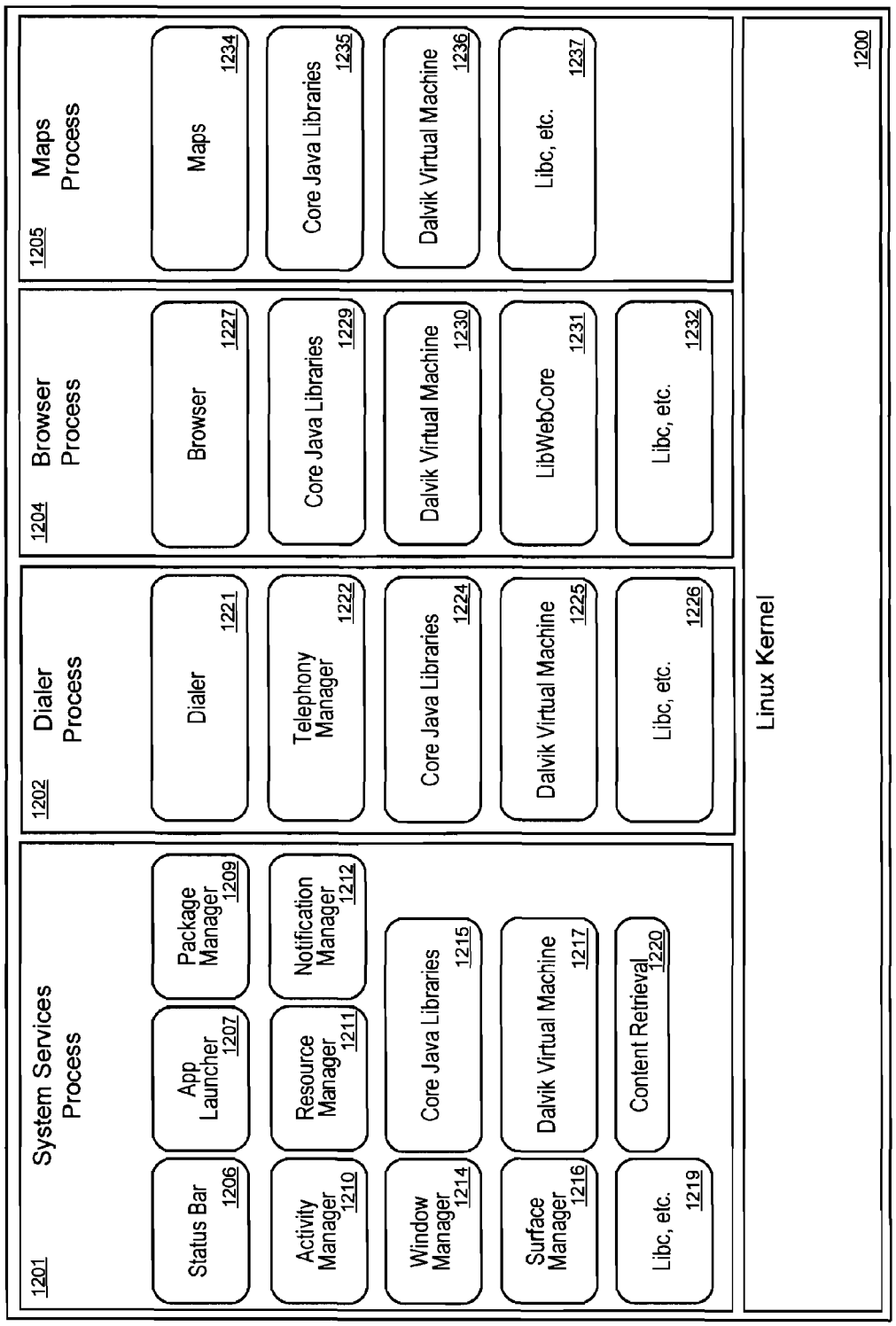
FIG. 12 is a block diagram illustrating exemplary processes implemented by the operating system kernel of FIG. 11.

FIG. 12 is a block diagram illustrating exemplary processes implemented by the operating system kernel 914. Generally, applications and system services run in separate processes, where the activity manager 1146 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 1216, the window manager 1214, or the activity manager 1210, can be continuously executed while the device is powered. Additionally, some application-specific process can also be persistent. For example, processes associated with the dialer application 1221 may also be persistent.

The processes implemented by the operating system kernel 914 may generally be categorized as system services processes 1201, dialer processes 1202, browser processes 1204, and maps processes 1205. The system services processes 1201 include status bar processes 1206 associated with the status bar 1139; application launcher processes 1207 associated with the application launcher 1140; package manager processes 1209 associated with the package manager 1141; activity manager processes 1210 associated with the activity manager 1146; resource manager processes 1211 associated with a resource manager that provides access to graphics, localized strings, and XML layout descriptions; notification manger processes 1212 associated with the notification manager 1144; window manager processes 1214 associated with the window manager 1145; core JAVA libraries processes 1215 associated with the core JAVA libraries 1131; surface manager processes 1216 associated with the surface manager 1121; Dalvik virtual machine processes 1217 associated with the Dalvik virtual machine 1132, LIBC processes 1219 associated with the LIBC library 1125; and web content retrieval and posting processes 1220 associated with the non-browser application 1152.

The dialer processes 1202 include dialer application processes 1221 associated with the dialer application 1149; telephony manager processes 1222 associated with the telephony manager 1142; core JAVA libraries processes 1224 associated with the core JAVA libraries 1131; Dalvik virtual machine processes 1225 associated with the Dalvik Virtual machine 1132; and LIBC processes 1226 associated with the LIBC library 1125. The browser processes 1204 include browser application processes 1227 associated with the browser application 1151; core JAVA libraries processes 1229 associated with the core JAVA libraries 1131; Dalvik virtual machine processes 1230 associated with the Dalvik virtual machine 1132; LIBWEBCORE processes 1231 associated with the LIBWEBCORE library 1126; and LIBC processes 1232 associated with the LIBC library 1125.

The maps processes 1205 include maps application processes 1234, core JAVA libraries processes 1235, Dalvik virtual machine processes 1236, and LIBC processes 1237. Notably, some processes, such as the Dalvik virtual machine processes, may exist within one or more of the systems services processes 1201, the dialer processes 1202, the browser processes 1204, and the maps processes 1205.

Figure 13:
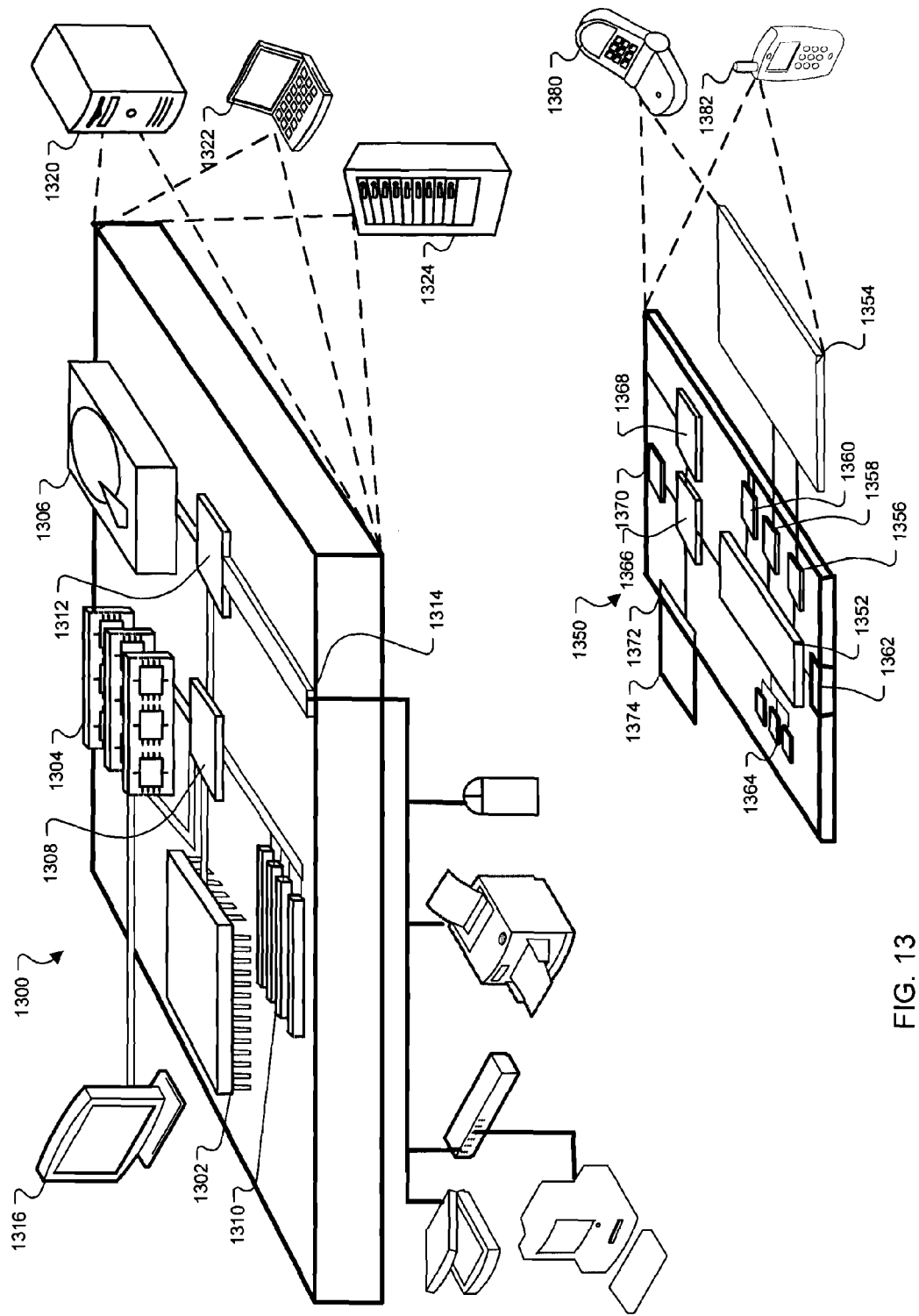
FIG. 13 shows an example of a computer device and a mobile computer device that can be used to implement the techniques described here.

FIG. 13 shows an example of a generic computer device 1300 and a generic mobile computer device 1350, which may be used with the techniques described here. Computing device 1300 is intended to represent various forms of digital computers, such as laptops, desktops, workstations, personal digital assistants, servers, blade servers, mainframes, and other appropriate computers. Computing device 1350 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, memory on processor 1302, or a propagated signal.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, memory on processor 1352, or a propagated signal that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smartphone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, a unified framework system can be executed on a desktop computer, where non-browser applications can combine data retrieved from web pages and internal data stored on the desktop computer to generate customized content. For example, the desktop computer can retrieve content from an elementary school web page that includes the meals served on different days. This data can be combined with calendar data used by a native application on the desktop to create calendar entries for a user's personal calendar that specify what is served for the current week at the elementary school.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
registering, by a computing device, an association between a first universal resource identifier (URI) and a first native application in a registry, the first native application being native to the computing device;
registering, by the computing device, an association between a second URI and a second native application in the registry, the second native application being native to the computing device;
receiving an indication of first user input requesting retrieval of first content associated with the first URI;
accessing the registry to identify that the first URI is assigned to the first native application;
providing the first URI to the first native application responsive to having identified that the first URI is associated with the first native application in the registry;
sending, by the first native application and to a first remote server in response to receiving the first URI, a request for the first content;
receiving, by the first native application and from the first remote server, the requested first content;
reformatting, by the first native application, the first content into a first modified format, such that the content can be rendered by the first native application;
displaying, by the first native application, the content in the first modified format on a display screen of the computing device;
receiving an indication of second user input requesting retrieval of second content associated with the second URI;
accessing the URI handling registry to identify that the second URI is assigned to the second native application;
providing the second URI to the second native application responsive to having identified that the second URI is associated with the second native application in the registry;
sending, by the second native application and to a second remote server in response to receiving the second URI, a request for the second content;
receiving, by the second native application and from the second remote server, the requested second content;
reformatting, by the second native application, the second content into a second modified format, such that the content can be rendered in the second native application; and
displaying, by the second native application, the content in the second modified format on the display screen of the computing device.

2. The method of claim 1, wherein the computing device is a mobile device and reformatting the first content includes reformatting the first content for display on a display screen of the mobile device, and reformatting the second content includes reformatting the second content for display on the screen of the mobile device.

3. The method of claim 1, further comprising receiving markup language code along with the first content, the markup language code including instructions for displaying the content within a browser application, and the first modified format is a format that is not dictated by the markup language code.

4. The method of claim 1, wherein the first native application is not configured to display web pages in a format controlled by a markup language of the web pages, but is configured to display content from the web pages in a format that is not controlled by the markup language of the web pages.

5. The method of claim 4, wherein the first user input originates within a third native application, the third native application being distinct from the first and second native applications, the third native application being native to the computing device, and the third native application being configured to display web pages in a format controlled by a markup language of the web pages.

6. The method of claim 5, wherein the third native application is an instant messaging application and the first user input is a selection of the URI within a display of the third native application.

7. A non-transitory computer-readable medium having instructions stored thereon, the instructions, when executed by one or more processors, cause the one or more processors to perform operations comprising:
registering, by a computing device, an association between a first universal resource identifier (URI) and a first native application in a registry, the first native application being native to the computing device;
registering, by the computing device, an association between a second URI and a second native application in the registry, the second native application being native to the computing device;
receiving an indication of first user input requesting retrieval of first content associated with the first URI;
accessing the registry to identify that the first URI is assigned to the first native application;
providing the first URI to the first native application responsive to having identified that the first URI is associated with the first native application in the registry;
sending, by the first native application and to a first remote server in response to receiving the first URI, a request for the first content;
receiving, by the first native application and from the first remote server, the requested first content;
reformatting, by the first native application, the first content into a first modified format, such that the content can be rendered by the first native application;
displaying, by the first native application, the content in the first modified format on a display screen of the computing device;
receiving an indication of second user input requesting retrieval of second content associated with the second URI;
accessing the URI handling registry to identify that the second URI is assigned to the second native application;
providing the second URI to the second native application responsive to having identified that the second URI is associated with the second native application in the registry;
sending, by the second native application and to a second remote server in response to receiving the second URI, a request for the second content;
receiving, by the second native application and from the second remote server, the requested second content;
reformatting, by the second native application, the second content into a second modified format, such that the content can be rendered in the second native application; and displaying, by the second native application, the content in the second modified format on the display screen of the computing device.

8. The non-transitory computer-readable medium of claim 7, wherein the computing device is a mobile device and reformatting the first content includes reformatting the first content for display on a display screen of the mobile device, and reformatting the second content includes reformatting the second content for display on the screen of the mobile device.

9. The non-transitory computer-readable medium of claim 7, the operations further comprising receiving markup language code along with the first content, the markup language code including instructions for displaying the content within a browser application, and the first modified format is a format that is not dictated by the markup language code.

10. The non-transitory computer-readable medium of claim 7, wherein the first native application is not configured to display web pages in a format controlled by a markup language of the web pages, but is configured to display content from the web pages in a format that is not controlled by the markup language of the web pages.

11. The non-transitory computer-readable medium of claim 10, wherein the first user input originates within a third native application, the third native application being distinct from the first and second native applications, the third native application being native to the computing device, and the third native application being configured to display web pages in a format controlled by a markup language of the web pages.

12. The non-transitory computer-readable medium of claim 11, wherein the third native application is an instant messaging application and the first user input is a selection of the URI within a display of the third native application.

13. A system comprising:
one or more processors; and
memory having instructions stored thereon, the instructions, when executed by the one or more processors, arranged to cause the processors to perform operations comprising:
registering, by a computing device, an association between a first universal resource identifier (URI) and a first native application in a registry, the first native application being native to the computing device;
registering, by the computing device, an association between a second URI and a second native application in the registry, the second native application being native to the computing device;
receiving an indication of first user input requesting retrieval of first content associated with the first URI;
accessing the registry to identify that the first URI is assigned to the first native application;
providing the first URI to the first native application responsive to having identified that the first URI is associated with the first native application in the registry;
sending, by the first native application and to a first remote server in response to receiving the first URI, a request for the first content;
receiving, by the first native application and from the first remote server, the requested first content;
reformatting, by the first native application, the first content into a first modified format, such that the content can be rendered by the first native application;
displaying, by the first native application, the content in the first modified format on a display screen of the computing device;
receiving an indication of second user input requesting retrieval of second content associated with the second URI;
accessing the URI handling registry to identify that the second URI is assigned to the second native application;
providing the second URI to the second native application responsive to having identified that the second URI is associated with the second native application in the registry;
sending, by the second native application and to a second remote server in response to receiving the second URI, a request for the second content;
receiving, by the second native application and from the second remote server, the requested second content;
reformatting, by the second native application, the second content into a second modified format, such that the content can be rendered in the second native application; and
displaying, by the second native application, the content in the second modified format on the display screen of the computing device.

14. The system of claim 13, wherein the computing device is a mobile device and reformatting the first content includes reformatting the first content for display on a display screen of the mobile device, and reformatting the second content includes reformatting the second content for display on the screen of the mobile device.

15. The system of claim 13, the operations further comprising receiving markup language code along with the first content, the markup language code including instructions for displaying the content within a browser application, and the first modified format is a format that is not dictated by the markup language code.

16. The system of claim 13, wherein the first native application is not configured to display web pages in a format controlled by a markup language of the web pages, but is configured to display content from the web pages in a format that is not controlled by the markup language of the web pages.

17. The system of claim 16, wherein the first user input originates within a third native application, the third native application being distinct from the first and second native applications, the third native application being native to the computing device, and the third native application being configured to display web pages in a format controlled by a markup language of the web pages.

18. The system of claim 17, wherein the third native application is an instant messaging application and the first user input is a selection of the URI within a display of the third native application.

* * * * *